(12) United States Patent
Shimazu et al.

(10) Patent No.: US 12,448,081 B2
(45) Date of Patent: Oct. 21, 2025

(54) PEDAL ASSEMBLY FOR HUMAN POWERED VEHICLE

(71) Applicant: Shimano Inc., Osaka (JP)

(72) Inventors: Hayato Shimazu, Osaka (JP); Zheng Chuan Tan, Johor (MY); Yoong Chern Chai, Johor (MY); Mohamad Zaki Bin Md Salleh, Johor (MY); Kashfi Muhammad Khaizuran, Johor (MY)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 18/374,789

(22) Filed: Sep. 29, 2023

(65) Prior Publication Data

US 2025/0108879 A1 Apr. 3, 2025

(51) Int. Cl.
*B62M 3/08* (2006.01)

(52) U.S. Cl.
CPC ..................... *B62M 3/08* (2013.01)

(58) Field of Classification Search
CPC ......... B62M 3/08; B62M 3/083; B62M 3/086
See application file for complete search history.

(56) References Cited

U.S. PATENT DOCUMENTS

| | | | | |
|---|---|---|---|---|
| 3,159,074 A * | 12/1964 | Neuschotz | ............ | F16B 37/122 411/422 |
| 7,856,905 B2 * | 12/2010 | Hsieh | ............ | B62M 3/086 74/594.6 |
| 8,061,236 B2 * | 11/2011 | French | ............ | B62M 3/08 74/594.4 |
| 9,491,788 B1 | 11/2016 | Kasai et al. | | |
| 9,963,194 B2 * | 5/2018 | Hsieh | ............ | B62M 3/08 |
| 10,420,157 B2 | 9/2019 | Chuang et al. | | |
| 10,787,226 B1 * | 9/2020 | Chen | ............ | B62M 3/086 |
| 11,091,222 B1 * | 8/2021 | Hsieh | ............ | B62M 3/086 |
| 11,247,747 B1 * | 2/2022 | Chen | ............ | B62M 3/08 |
| 11,451,444 B2 | 9/2022 | Chuang | | |
| 2009/0100961 A1 * | 4/2009 | Hu | ............ | B62M 3/08 74/560 |
| 2014/0090516 A1 * | 4/2014 | Liang | ............ | B62M 3/08 74/594.4 |
| 2017/0066499 A1 * | 3/2017 | Yang | ............ | B62M 3/086 |
| 2020/0189689 A1 | 6/2020 | Wesling | | |
| 2021/0284284 A1 | 9/2021 | Ho | | |
| 2022/0371681 A1 | 11/2022 | Lin et al. | | |
| 2023/0051901 A1 * | 2/2023 | Semrow | ............ | F16B 37/122 |

FOREIGN PATENT DOCUMENTS

| | | | | |
|---|---|---|---|---|
| DE | 102004050664 B3 * | 3/2006 | ........... | A43B 1/0054 |
| JP | 2019-189137 A | 10/2019 | | |

* cited by examiner

*Primary Examiner* — Thomas C Diaz
(74) *Attorney, Agent, or Firm* — Global IP Counselors LLP; David Tarnoff

(57) ABSTRACT

A pedal assembly is provided for a human powered vehicle. The pedal assembly comprises a pedal body. The pedal body includes at least one adapter receiving portion configured to receive at least one adapter engaging with at least one fastening member so that a plurality of pedal components different from each other can be mounted to the pedal body through the at least one adapter. The at least one adapter receiving portion has a non-circular shape corresponding to an external shape of the at least one adapter.

28 Claims, 20 Drawing Sheets

PEDAL ASSEMBLY FOR HUMAN POWERED VEHICLE

BACKGROUND

Technical Field

This disclosure generally relates to a pedal assembly for a human powered vehicle. More specifically, the present disclosure relates to a pedal assembly that is configured to have at least one pedal component coupled thereto.

Background Information

Basically, a pedal typically includes a pedal axle and a pedal body. The pedal axle is configured to be attached to a crank of a human-powered vehicle. The pedal body is rotatably supported on the pedal axle. Often, pedals are designed for a specific purpose such as for comfort, recreational biking, off-road biking, road racing, exercising, etc., or designed for a user's preference. Some pedals are provided with a pedal component for keep a rider's foot from slipping off the pedal and/or improve pedaling efficiency. For example, some pedals are provided with a cleat coupling unit that is configured to releasably engage a cleat that is secured to the sole of a user's shoe. Some pedals are provided with a toe clip. In other pedals, the pedal body is provides with a friction pad and/or spike pins.

SUMMARY

Generally, the present disclosure is directed to various features of a pedal assembly for a human-powered vehicle. The term "human-powered vehicle" as used herein refers to a vehicle that can be propelled by at least human driving force to produce propulsion, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a pedal assembly is provided for a human powered vehicle. The pedal assembly basically comprises a pedal body. The pedal body includes at least one adapter receiving portion configured to receive at least one adapter engaging with at least one fastening member so that a plurality of pedal components different from each other can be mounted to the pedal body through the at least one adapter. The at least one adapter receiving portion has a non-circular shape corresponding to an external shape of the at least one adapter.

With the pedal assembly according to the first aspect, a plurality of pedal components different from each other can be reliably and easily mounted to the pedal body through the at least one adapter.

In accordance with a second aspect of the present disclosure, the pedal assembly according to the first aspect is configured so that the at least one adapter receiving portion includes a plurality of fastening holes. Each of the plurality of fastening holes is configured to receive an adapter of the at least one adapter.

With the pedal assembly according to the second aspect, the adapter can be easily coupled to the adapter receiving portion using a plurality of fastening holes.

In accordance with a third aspect of the present disclosure, the pedal assembly according to the first aspect or the second aspect is configured so that the at least one adapter includes a plurality of adapters. The at least one adapter receiving portion includes a plurality of adapter receiving portions. Each of the plurality of adapter receiving portions is configured to receive at least one of the plurality of adapters.

With the pedal assembly according to the third aspect, the pedal components can be securely mounted to the pedal body through the plurality of adapters.

In accordance with a fourth aspect of the present disclosure, the pedal assembly according to any one of the first aspect to the third aspect is configured so that the at least one adapter receiving portion includes a first adapter receiving portion configured to receive at least one first adapter of the at least one adapter and a second adapter receiving portion configured to receive at least one second adapter of the at least one adapter.

With the pedal assembly according to the fourth aspect, the pedal components can be securely mounted to the pedal body through at least one first adapter and at least one second adapter.

In accordance with a fifth aspect of the present disclosure, the pedal assembly according to the fourth aspect is configured so that the first adapter receiving portion is configured to receive a pair of the first adapters, and the second adapter receiving portion is configured to receive a pair of the second adapters.

With the pedal assembly according to the fifth aspect, the pedal components can be securely mounted to the pedal body through a pair of the first adapters, and a pair of the second adapters.

In accordance with a sixth aspect of the present disclosure, the pedal assembly according to any one of the first aspect to the fifth aspect is configured so that the pedal body has a first shoe-disposing surface and a second shoe-disposing surface opposite to the first shoe-disposing surface. The at least one adapter receiving portion includes a plurality of fastening holes extending completely through the pedal body from the first shoe-disposing surface to the second shoe-disposing surface. Each of the plurality of fastening holes is configured to receive an adapter of the at least one adapter. Each of the at least one adapter has a first shoe-disposing side opening configured to receive a first fastening member of the least one fastening member and a second shoe-disposing side opening configured to receive a second fastening member of the least one fastening member. The first shoe-disposing side opening is positioned at the first shoe-disposing surface. The second shoe-disposing side opening is positioned at the second shoe-disposing surface.

With the pedal assembly according to the sixth aspect, the pedal components can be securely mounted to either the first shoe-disposing surface and the second shoe-disposing surface of the pedal body.

In accordance with a seventh aspect of the present disclosure, the pedal assembly according to the sixth aspect is configured so that the at least one adapter receiving portion includes a first adapter receiving portion having a pair of first fastening holes of the plurality of fastening holes and a second adapter receiving portion having a pair of second fastening holes of the plurality of fastening holes.

With the pedal assembly according to the seventh aspect, the pedal components can be securely mounted to the pedal body.

In accordance with an eighth aspect of the present disclosure, the pedal assembly according to any one of the first aspect to the seventh aspect is configured so that the non-circular shape includes one of an oval shape, a D shape, a polygon shape and a quadrant shape.

With the pedal assembly according to the eighth aspect, the adapter will not rotate with respect to the adapter receiving portion.

In accordance with a ninth aspect of the present disclosure, the pedal assembly according to any one of the first aspect to the eighth aspect further comprises the at least one adapter non-rotatably coupled to the at least one adapter receiving portion.

With the pedal assembly according to the ninth aspect, the pedal components can be easily mounted to the pedal body using the at least one adapter.

In accordance with a tenth aspect of the present disclosure, the pedal assembly according to the ninth aspect is configured so that further comprises the at least one fastening member detachably coupled to the at least one adapter.

With the pedal assembly according to the tenth aspect, the pedal components can be easily mounted to and detached from the pedal body as needed and/or desired.

In accordance with an eleventh aspect of the present disclosure, the pedal assembly according to the tenth aspect is configured so that the at least one fastening member includes a plurality of fastening members. The plurality of fastening members include a first protrusion configured to restrict movement of the at least one adapter in a first direction with respect to the at least one adapter receiving portion and a second protrusion configured to restrict movement of the at least one adapter in a second direction with respect to the at least one adapter receiving portion. The second direction is different from the first direction.

With the pedal assembly according to the eleventh aspect, the adapter can be prevented from decoupling from the pedal body.

In accordance with a twelfth aspect of the present disclosure, the pedal assembly according to the tenth aspect is configured so that the pedal body has a first shoe-disposing surface and a second shoe-disposing surface opposite to the first shoe-disposing surface. The at least one adapter receiving portion includes a first adapter receiving portion having a pair of first fastening holes extending completely through the pedal body from the first shoe-disposing surface to the second shoe-disposing surface, and a second adapter receiving portion having a pair of second fastening holes extending completely through the pedal body from the first shoe-disposing surface to the second shoe-disposing surface. The at least one adapter includes a plurality of adapters. One of the plurality of adapters is disposed in each of the pair of first fastening holes and the pair of second fastening holes. The at least one fastening member includes a plurality of fastening members. Each of the plurality of adapters has a first shoe-disposing side opening configured to receive a first fastening member of the plurality of fastening members and a second shoe-disposing side opening configured to receive a second fastening member of the plurality of fastening members.

With the pedal assembly according to the twelfth aspect, the structure for attaching the pedal components to either the first shoe-disposing surface or the second shoe-disposing surface can be simplified.

In accordance with a thirteenth aspect of the present disclosure, the pedal assembly according to any one of the first aspect to the twelfth aspect further comprises a pedal axle having a rotational center axis defining an axial direction. The pedal body includes an inner body portion, an outer body portion, a first body portion extending in the axial direction, a second body portion extending in the axial direction and an intermediate body portion configured to receive the pedal axle and extending in the axial direction. The intermediate body portion is positioned between the outer body portion and the inner body portion and between the first body portion and the second body portion. The at least one adapter receiving portion is provided to the intermediate body portion.

With the pedal assembly according to the thirteenth aspect, the pedal assembly can be attached to a crank arm and pedal body can be configured with a sufficient shoe supporting surface for supporting a user's shoe.

In accordance with a fourteenth aspect of the present disclosure, the pedal assembly according to the thirteenth aspect is configured so that the at least one adapter receiving portion includes a plurality of fastening holes extending completely through the pedal body from a first shoe-disposing surface of the pedal body to a second shoe-disposing surface of the pedal body.

With the pedal assembly according to the fourteenth aspect, the pedal components can be mounted to either the first shoe-disposing surface or the second shoe-disposing surface.

In accordance with a fifteenth aspect of the present disclosure, the pedal assembly according to the first aspect is configured so that the plurality of fastening holes includes a pair of first fastening holes on a first side of the intermediate body portion.

With the pedal assembly according to the fifteenth aspect, the pedal components can be at least partly positioned on a first side of the intermediate body portion.

In accordance with a sixteenth aspect of the present disclosure, the pedal assembly according to the fifteenth aspect is configured so that the plurality of fastening holes includes a pair of second fastening holes on a second side of the intermediate body portion. The second side is opposite to the first side.

With the pedal assembly according to the sixteenth aspect, the pedal components can be at least partly positioned on a second side of the intermediate body portion.

In accordance with a seventeenth aspect of the present disclosure, the pedal assembly according to the sixteenth aspect is configured so that the first fastening holes are spaced apart from each other in the axial direction by a first distance, and the second fastening holes are spaced apart from the first fastening holes in a direction perpendicular to the axial direction by a second distance different from the first distance.

With the pedal assembly according to the seventeenth aspect, the pedal components can be securely attached to the pedal body in the axial direction and a direction perpendicular to the axial direction.

In accordance with an eighteenth aspect of the present disclosure, the pedal assembly according to the seventeenth aspect is configured so that the second distance is smaller than the first distance.

With the pedal assembly according to the eighteenth aspect, pedal components can be securely attached to the pedal body near the pedal axle.

In accordance with a nineteenth aspect of the present disclosure, the pedal assembly according to the seventeenth aspect or the eighteenth aspect is configured so that the second fastening holes are spaced apart from each other in the axial direction by the first distance.

With the pedal assembly according to the nineteenth aspect, the pedal components can further be securely attached to the pedal body in the axial direction.

In accordance with a twentieth aspect of the present disclosure, the pedal assembly according to the tenth aspect further comprises the plurality of pedal components configured to be selectively coupled to the at least one adapter receiving portion of the pedal body using the at least one fastening member.

With the pedal assembly according to the twentieth aspect, the pedal components can be selectively attached to the pedal body as needed and/or desired in accordance with a user's preference.

In accordance with a twenty-first aspect of the present disclosure, the pedal assembly according to the twentieth aspect is configured so that the plurality of pedal components includes a cleat coupling unit.

With the pedal assembly according to the twenty-first aspect, a cleat coupling unit can be attached to the pedal body.

In accordance with a twenty-second aspect of the present disclosure, the pedal assembly according to the twentieth aspect is configured so that the plurality of pedal components includes a toe-clip.

With the pedal assembly according to the twenty-second aspect, a toe-clip can be attached to the pedal body.

In accordance with a twenty-third aspect of the present disclosure, the pedal assembly according to the twentieth aspect is configured so that the plurality of pedal components includes a friction pad.

With the pedal assembly according to the twenty-third aspect, a friction pad can be attached to the pedal body.

In accordance with a twenty-fourth aspect of the present disclosure, the pedal assembly according to the twenty-third aspect is configured so that the friction pad includes a first pad part and a second pad part, and the second pad part is a separate piece from the first pad part.

With the pedal assembly according to the twenty-fourth aspect, the friction pad can be easily attached to the pedal body.

In accordance with a twenty-fifth aspect of the present disclosure, the pedal assembly according to the twentieth aspect is configured so that the plurality of pedal components includes at least pair of a cleat coupling unit, a toe-clip and a friction pad.

With the pedal assembly according to the twenty-fifth aspect, it is possible to selectively couple one or more of a cleat coupling units, a toe-clip, a friction pad and a plurality of spike pins to the pedal body in accordance with a user's preference.

In accordance with a twenty-sixth aspect of the present disclosure, an adapter is provided for a pedal assembly configured to be used with a human powered vehicle. The adapter is configured to be received in an adapter receiving portion of a pedal body of the pedal assembly. The adapter comprises an adapter body. The adapter body has at least one threaded hole. The at least one threaded hole is configured to engage with at least one fastening member. The adapter body has a non-circular shape in a cross-section view. The non-circular shape of the adapter body corresponds to a non-circular shape of the adapter receiving portion of the pedal body of the pedal assembly.

With the adapter according to the twenty-sixth aspect, the adapter can be attached a pedal body for easily attaching a plurality of pedal components.

In accordance with a twenty-seventh aspect of the present disclosure a pedal assembly is provided for a human powered vehicle. The pedal assembly basically comprises a pedal body and a plurality of adapters. The pedal body includes a plurality of fastening holes. The plurality of adapters are disposed inside the plurality of fastening holes so that at least one pedal component can be mounted to the pedal body through the plurality of adapters.

With the pedal assembly according to the twenty-seventh aspect, a plurality of pedal components different from each other can be reliably and easily mounted to the pedal body through a plurality of adapters disposed inside the plurality of fastening holes.

Also, other objects, features, aspects and advantages of the disclosed pedal assembly will become apparent to those skilled in the art from the following detailed description, which, taken in conjunction with the annexed drawings, discloses preferred embodiments of the pedal assembly.

BRIEF DESCRIPTION OF THE DRAWINGS

Referring now to the attached drawings which form a part of this original disclosure.

DETAILED DESCRIPTION

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
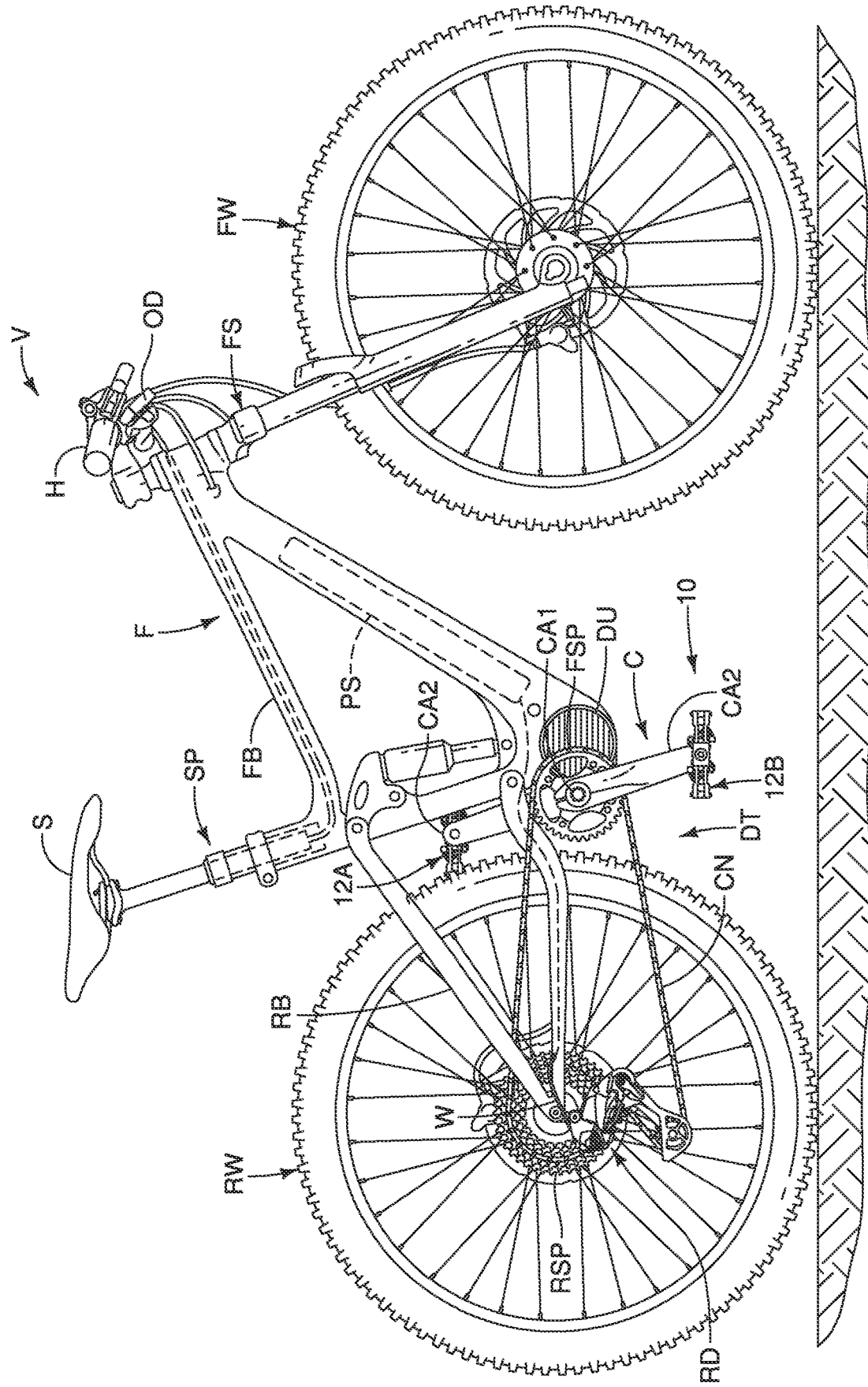
FIG. 1 is a side elevational view of a human-powered vehicle (e.g., a bicycle) equipped a pair of pedal assemblies including a pair of coupling units in accordance with a first embodiment of the present disclosure.

Referring initially to FIG. 1, a human-powered vehicle V (e.g., a bicycle) is illustrated that is equipped with a pedal assembly 10 in accordance with a first embodiment. In other words, the pedal assembly 10 is provided for the human-powered vehicle V. For example, the human-powered vehicle V is a bicycle. In the illustrated embodiment, for example, the human-powered vehicle V is an electric assist mountain bike (i.e., an off-road bicycle). Alternatively, the human-powered vehicle V can be a road bicycle, a city bike, a cargo bike, and a recumbent bike, or another type of off-road bicycle such as a cyclocross bicycle. The number of wheels on the human-powered vehicle V is not limited. The human-powered vehicle V includes, for example, a monocycle and a vehicle having three or more wheels. Here, the human-powered vehicle V is a bicycle that at least partially uses human power as a driving power for traveling and includes an electric drive unit assisting the human power. In particular, a vehicle using solely an internal combustion engine as driving power is not included in the human-powered vehicle of this disclosure. More specifically, in the embodiments described below, the human-powered vehicle V is an electric assist bicycle (E-bike).

As seen in FIG. 1, the human-powered vehicle V includes a vehicle body VB that is equipped with a plurality of vehicle components. As seen in FIG. 1, the vehicle body VB has a front frame body FB and a rear frame body RB (a swing arm) swingably mounted to a rear section of the front frame body FB such that the rear frame body RB can pivot with respect to the front frame body FB. A rear wheel RW is mounted to the rear frame body RB and a front wheel FW is mounted to the front frame body FB via a front suspension FS. A bicycle seat or saddle S is adjustably mounted to the front frame body FB by an adjustable seatpost SP. A rear suspension RS is provided between the front frame body FB and the rear frame body RB to control the movement of the rear frame body RB with respect to the front frame body FB. Namely, the rear suspension RS is configured to absorb a shock imparted to the rear wheel RW. The front suspension FS is pivotally mounted to a head tube of the front frame body FB. A handlebar H is mounted to an upper end of a steering column steerer tube of the front suspension FS. The front suspension FS is configured to absorb a shock imparted to the front wheel FW. The front wheel FW is mounted to a lower end of the front suspension FS. The rear wheel RW is mounted to a rear end of the rear frame body RB.

The human-powered vehicle V further includes a drivetrain DT and a drive unit DU operatively coupled to the drivetrain DT. The drive unit DU is also referred to as an electric assist unit. Here, for example, the drivetrain DT is a chain-drive type that includes a crank C, a front sprocket FSP, a plurality of rear sprockets RSP and a chain CN. The crank C includes a crank axle CA1 and a pair of crank arms CA2. The crank axle CA1 is rotatably supported to the front frame body FB via the electric assist unit DU. The crank arms CA2 are provided on opposite ends of the crank axle CA1.

A pedal 12A is rotatably coupled to the distal end of one of the crank arms CA2, and a pedal 12B is rotatably coupled to the distal end of the other one of the crank arms CA2. The pedal assembly 10 basically comprises the pedals 12A and 12B. The drivetrain DT can be selected from any type, and can be a belt-drive type or a shaft-drive type. Here, the human-powered vehicle V further includes a front derailleur FD that is attached to the front frame body FB for shifting the chain CN between the front sprockets FSP, and a rear derailleur RD that is attached to the rear frame body RB for shifting the chain CN between the rear sprockets RSP. The front derailleur FD and the rear derailleur RD are one type of gear changing device or transmission device for change a gear ratio of the drivetrain DT.

The front sprocket FSP is provided on the crank C to rotate integrally with the crank axle CA1. The rear sprockets RSP are provided on a hub HR of the rear wheel RW. The chain CN runs around the front sprocket FSP and the rear sprockets RSP. A human driving force is applied to the pedals 12A and 12B by a rider or user of the human-powered vehicle V such that the driving force is transmitted via the front sprocket FSP, the chain CN and the rear sprockets RSP to the rear wheel RW.

The drive unit DU is actuated to assist in propulsion of the human-powered vehicle V in a conventional manner. The drive unit DU is actuated, for example, in accordance with a human driving force applied to the pedals 12A and 12B. The drive unit DU includes an electric motor that is operatively coupled to the front sprocket FSP. The drive unit DU is actuated by electrical power that is supplied from a power supply PS.

Figure 2:
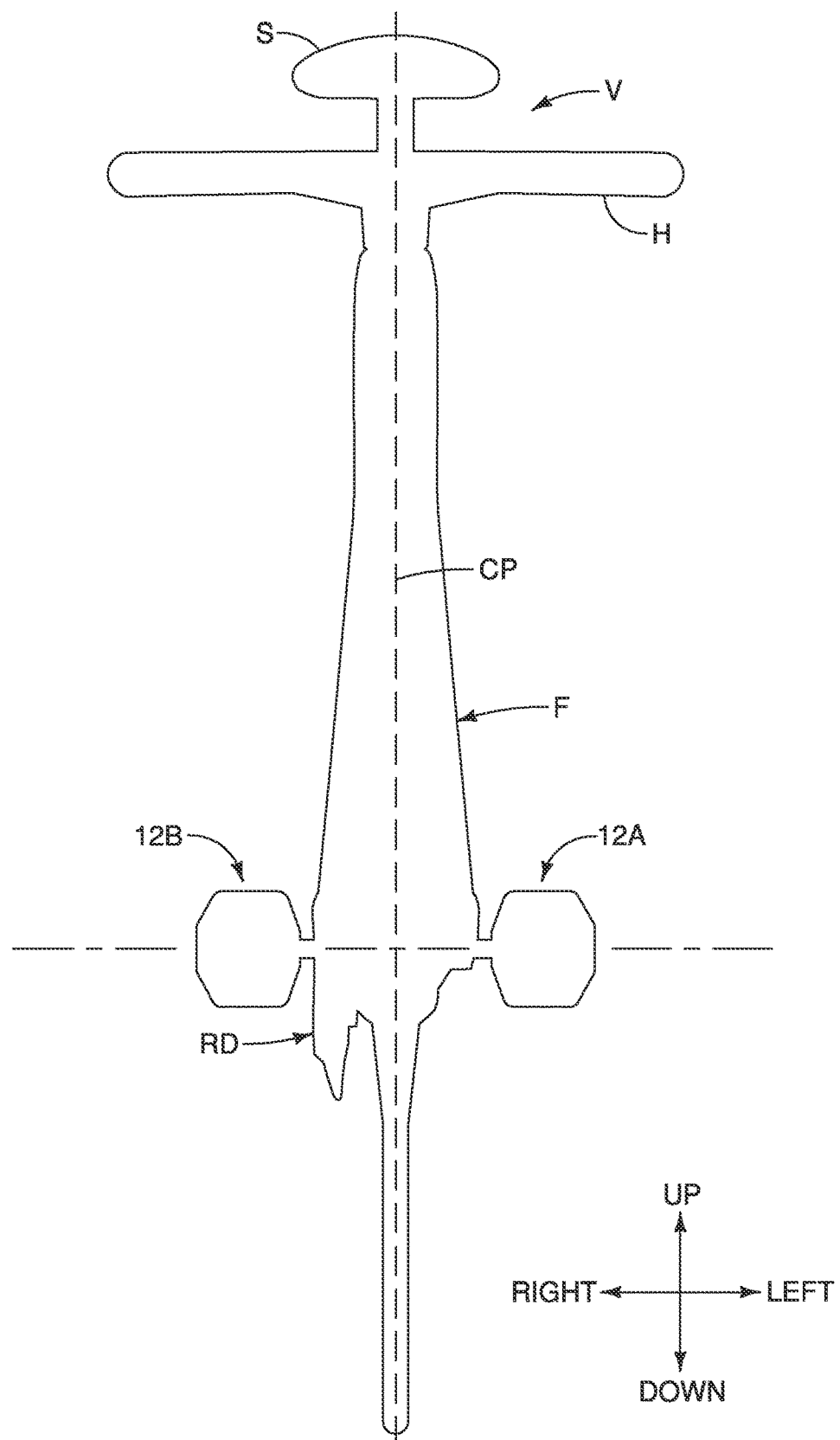
FIG. 2 is an outline of the human-powered vehicle (e.g., a bicycle) equipped with the pedal assembly illustrated in FIG. 1 as viewed from in front of the human-powered vehicle and along a longitudinal direction to show a center plane vertically bisecting a frame of the human-powered vehicle.

Referring to FIG. 2, an outline of the human-powered vehicle V is illustrated as viewed from in front of the human-powered vehicle V and along a longitudinal direction to show a center plane CP vertically bisecting the frame F of the human-powered vehicle V. The center plane CP passes through a center of the frame F in a width direction of the frame F. The center plane CP separates a left side from a right side of the human-powered vehicle V. The following directional terms "front," "rear," "forward," "rearward," "left," "right," "lateral," "longitudinal", "upward," and "downward," as well as any other similar directional terms, refer to those directions which are determined on the basis of a rider sitting upright on the seat S of the human-powered vehicle V while facing the handlebar H of the human-powered vehicle V.

Referring back to FIG. 1, in the illustrated embodiment, the pedal 12A of the pedal assembly 10 is a left pedal. The pedal 12B of the pedal assembly 10 is a right pedal. Thus, the pedal 12A is attached to the crank arm CA2 provided on the left side of the human-powered vehicle V, and the pedal 12B is attached to the crank arm CA2 provided on the right side of the human-powered vehicle V.

Referring to now FIG. 3 and as described below, the pedal 12A is configured so that a dealer and/or user can easily customize the pedal 12A. Thus, the pedal assembly 10 further comprises a plurality of pedal components. More specifically, the pedal 12A is configured so that the plurality of pedal components can be selectively coupled thereto as needed and/or desired to customize the pedal 12A. For example, the plurality of pedal components includes at least a cleat coupling unit 14. The one or two cleat coupling units 14 can be attached to the pedal 12A to form a step-in pedal. Also, for example, the plurality of pedal components includes a toe-clip 15. The toe-clip 15 can be attached to the pedal 12A to form a clip-in pedal. Also, for example, the plurality of pedal components includes a friction pad 16. The friction pad 16 can be attached to one or both sides of the pedal 12A to form a flat pedal. Also, for example, the plurality of pedal components includes a plurality of spike pins 17. The spike pins 17 can be attached to the pedal 12A to form a spiked flat pedal.

Figure 6:
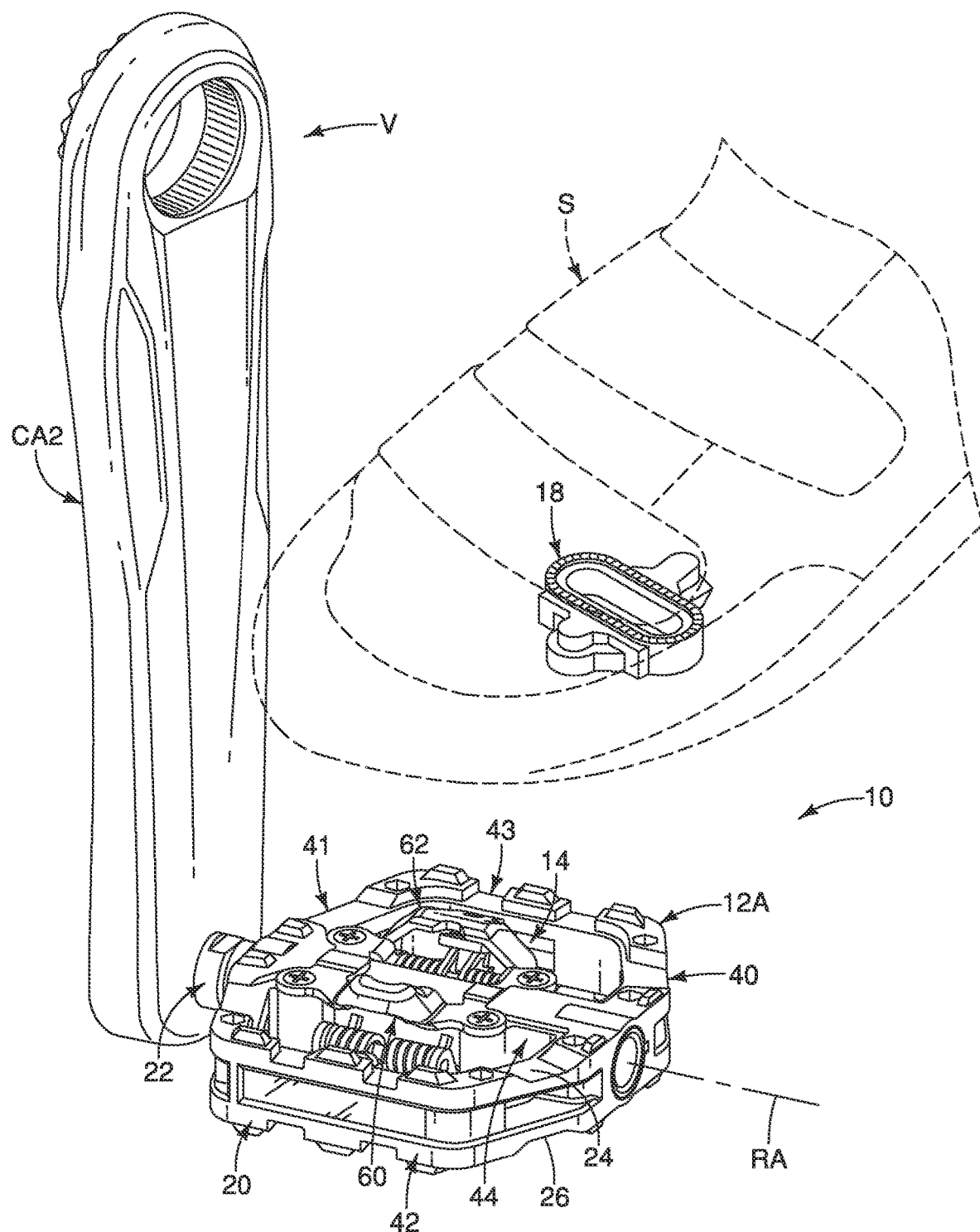
FIG. 6 is a perspective view of the pedal assembly illustrated in FIG. 1 where a pair of cleat coupling units have been attached to the pedal, the pedal is coupled to one of the crank arm, and a cleat is coupled to a cycling shoe.
Figure 7:
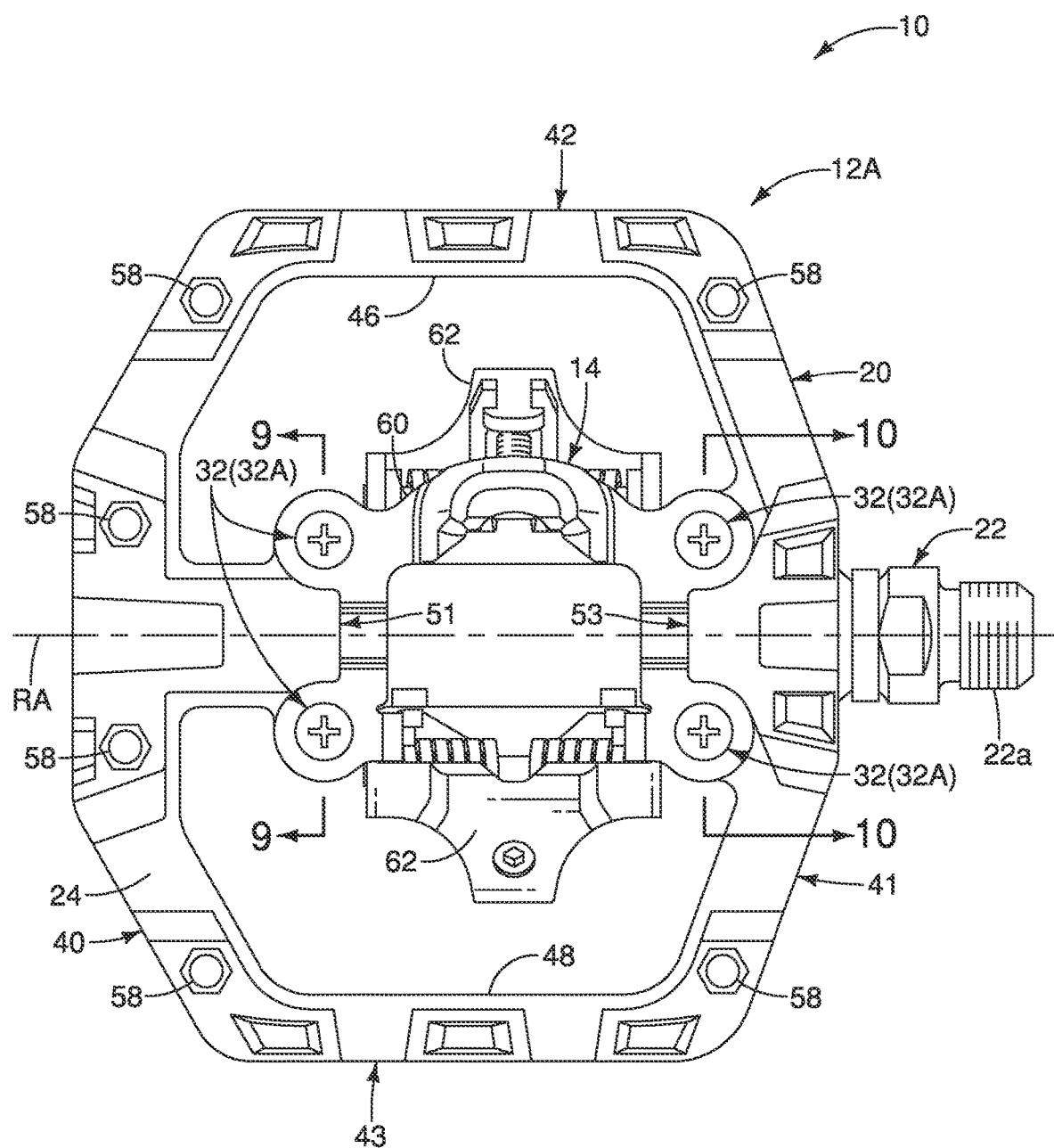
FIG. 7 is a top plan view of the pedal assembly having the cleat coupling units illustrated in FIG. 6.
Figure 8:
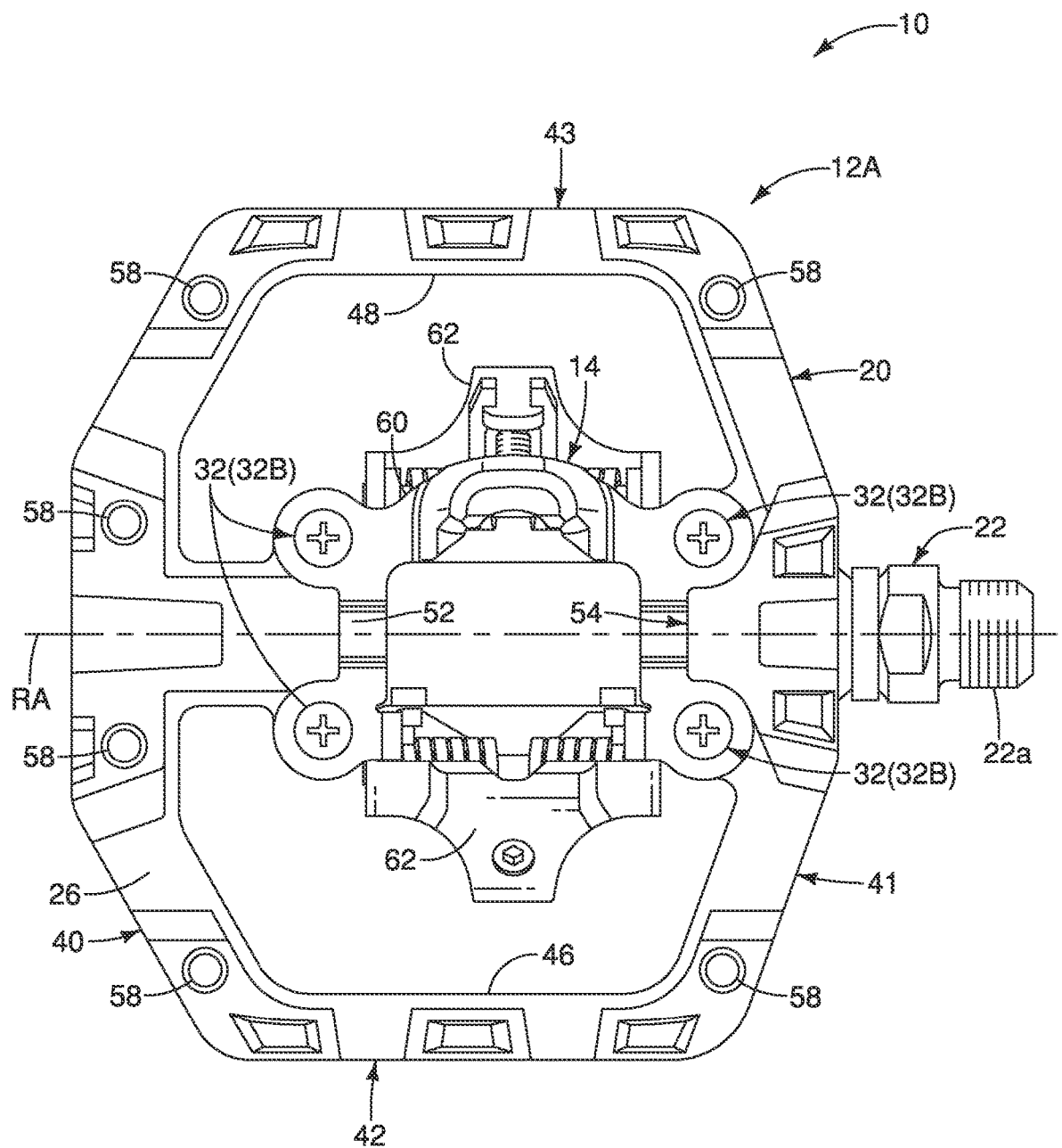
FIG. 8 is a bottom plan view of the pedal assembly illustrated in FIGS. 6 and 7.
Figure 15:
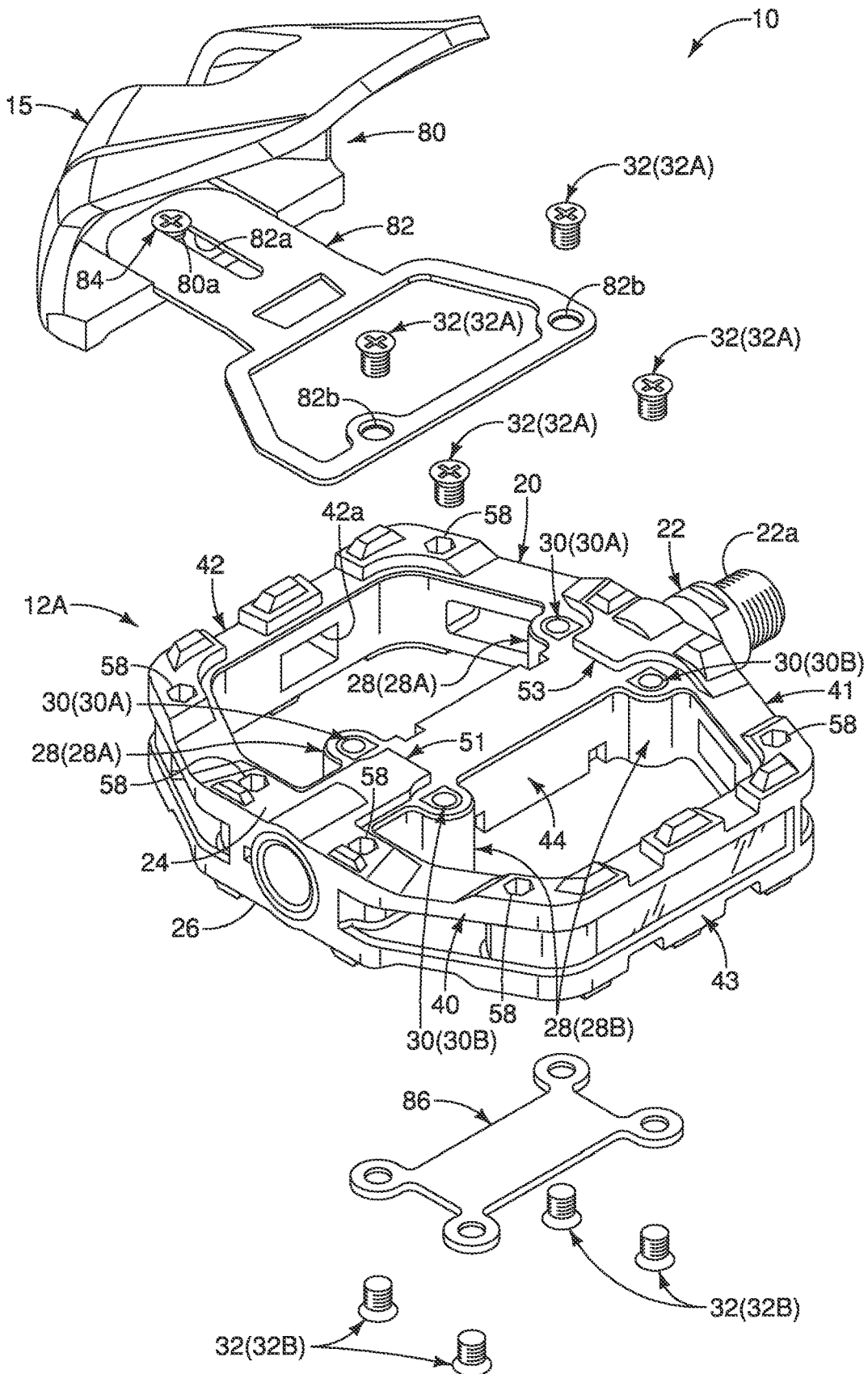
FIG. 15 is an exploded perspective view of the pedal assembly illustrated in FIGS. 12 to 14.
Figure 16:
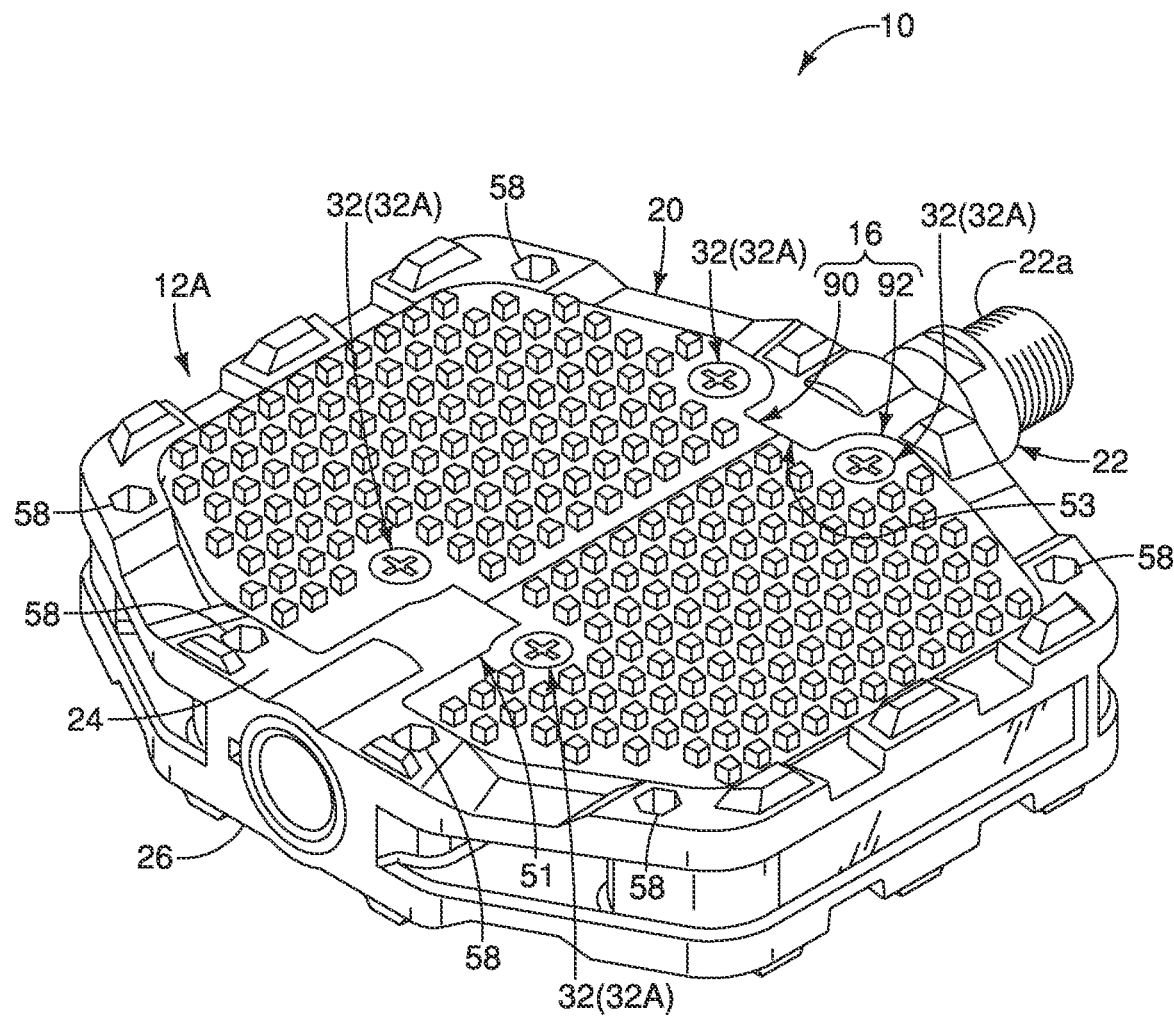
FIG. 16 is a top side perspective view of the pedal assembly where a friction pad has been attached to the pedal body illustrated in FIG. 5 by the adapters.
Figure 17:
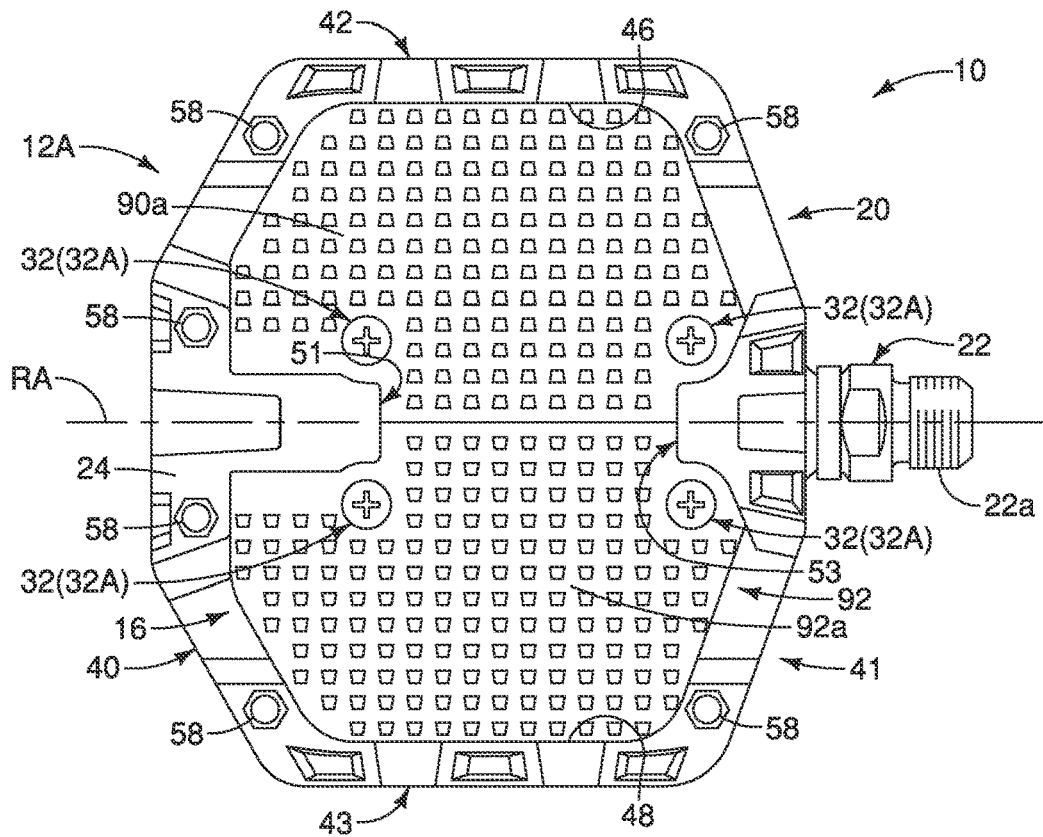
FIG. 17 is a top plan view of the pedal assembly illustrated in FIG. 16.
Figure 18:
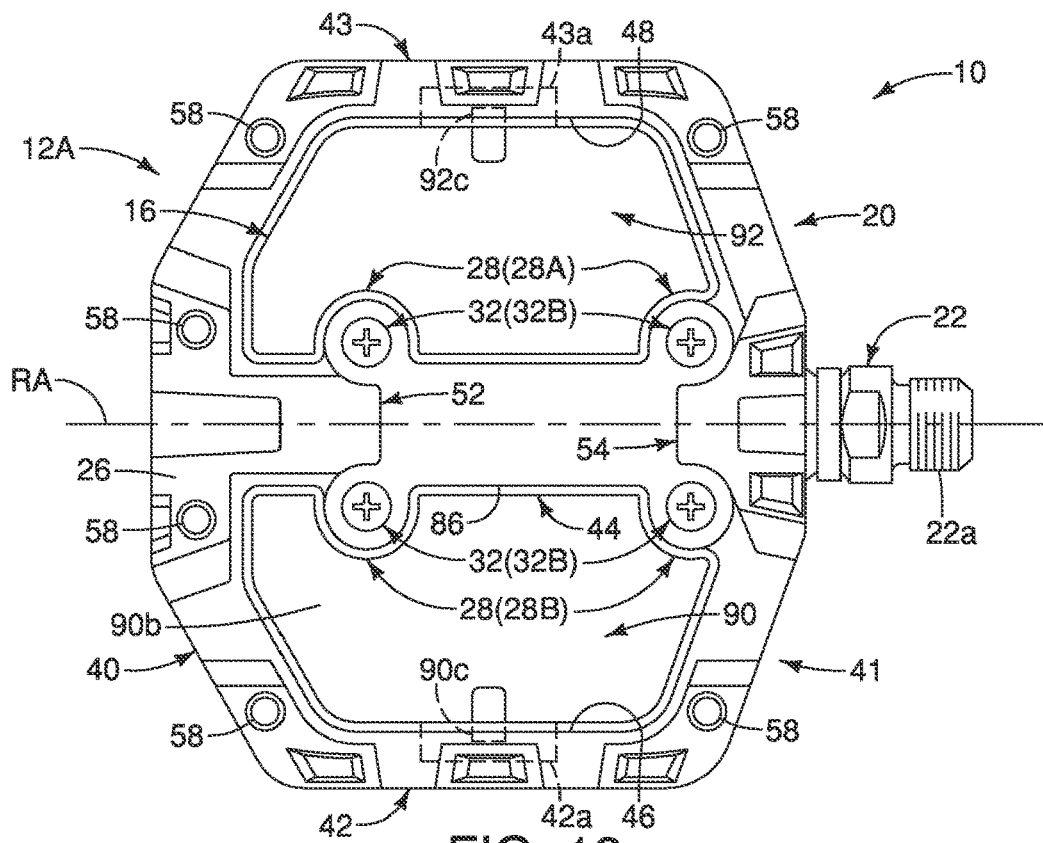
FIG. 18 is a bottom plan view of the pedal assembly illustrated in FIGS. 16 and 17.
Figure 19:
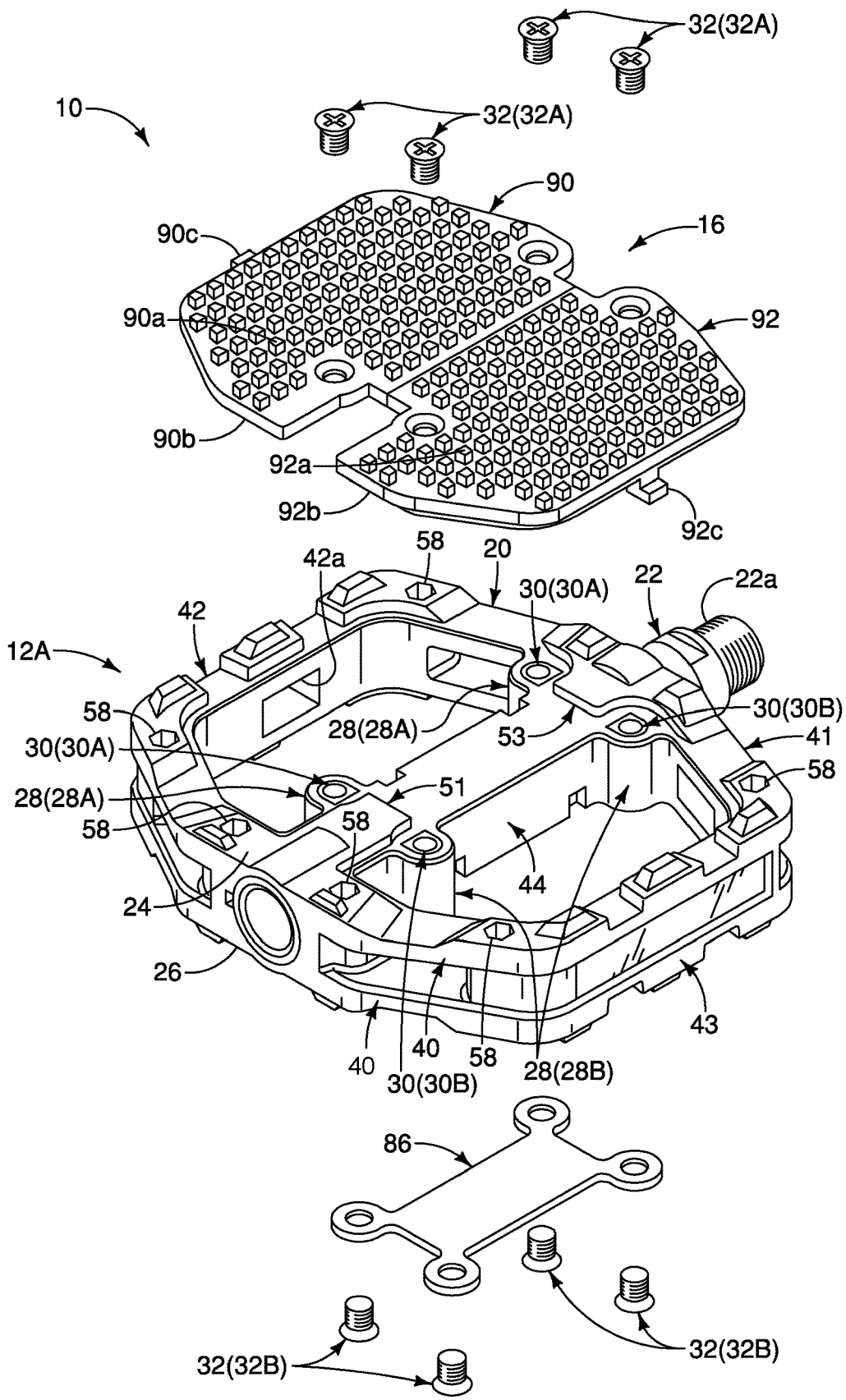
FIG. 19 is an exploded perspective view of the pedal assembly illustrated in FIGS. 16 to 18.
Figure 20:
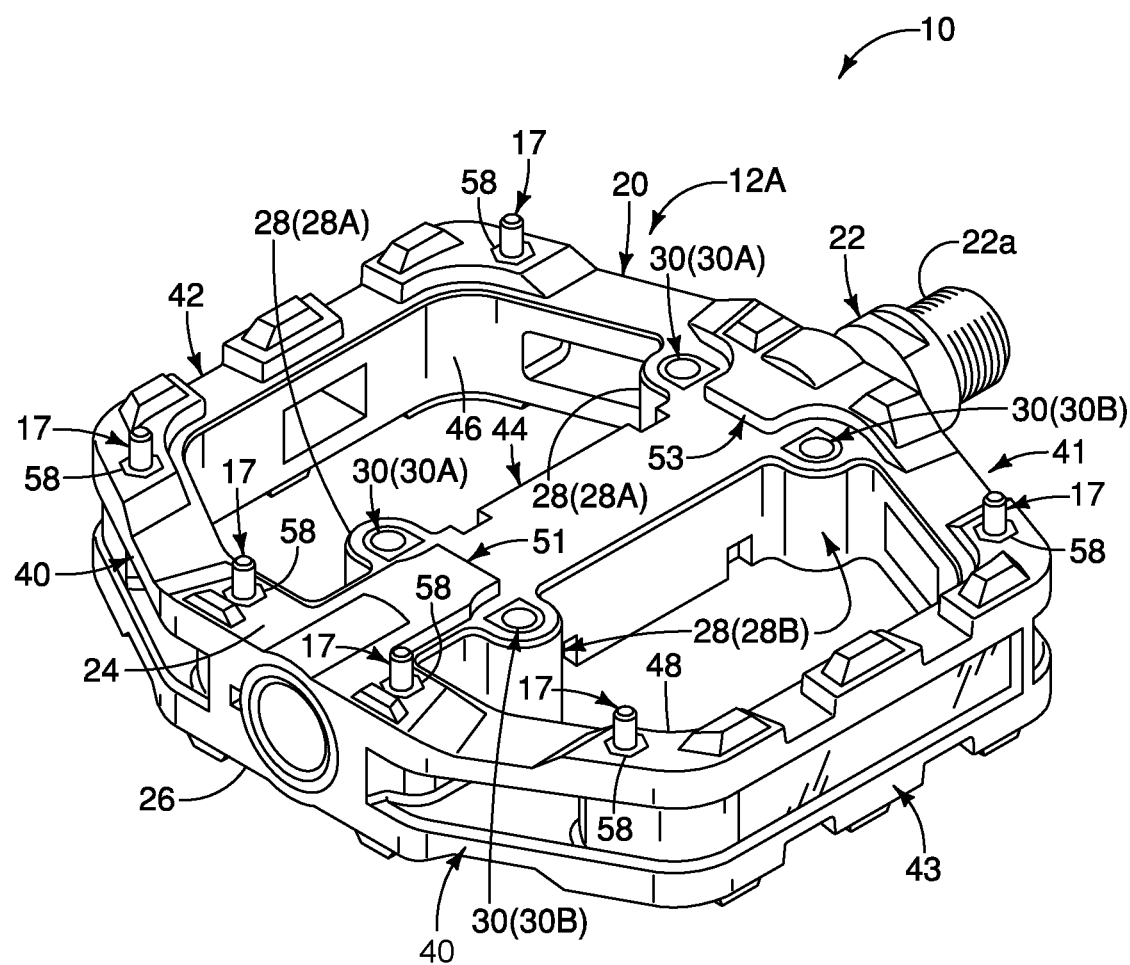
FIG. 20 is a top side perspective view of the pedal assembly where a plurality of spike pins been attached to the pedal body illustrated in FIGS. 4 and 5.
Figure 21:
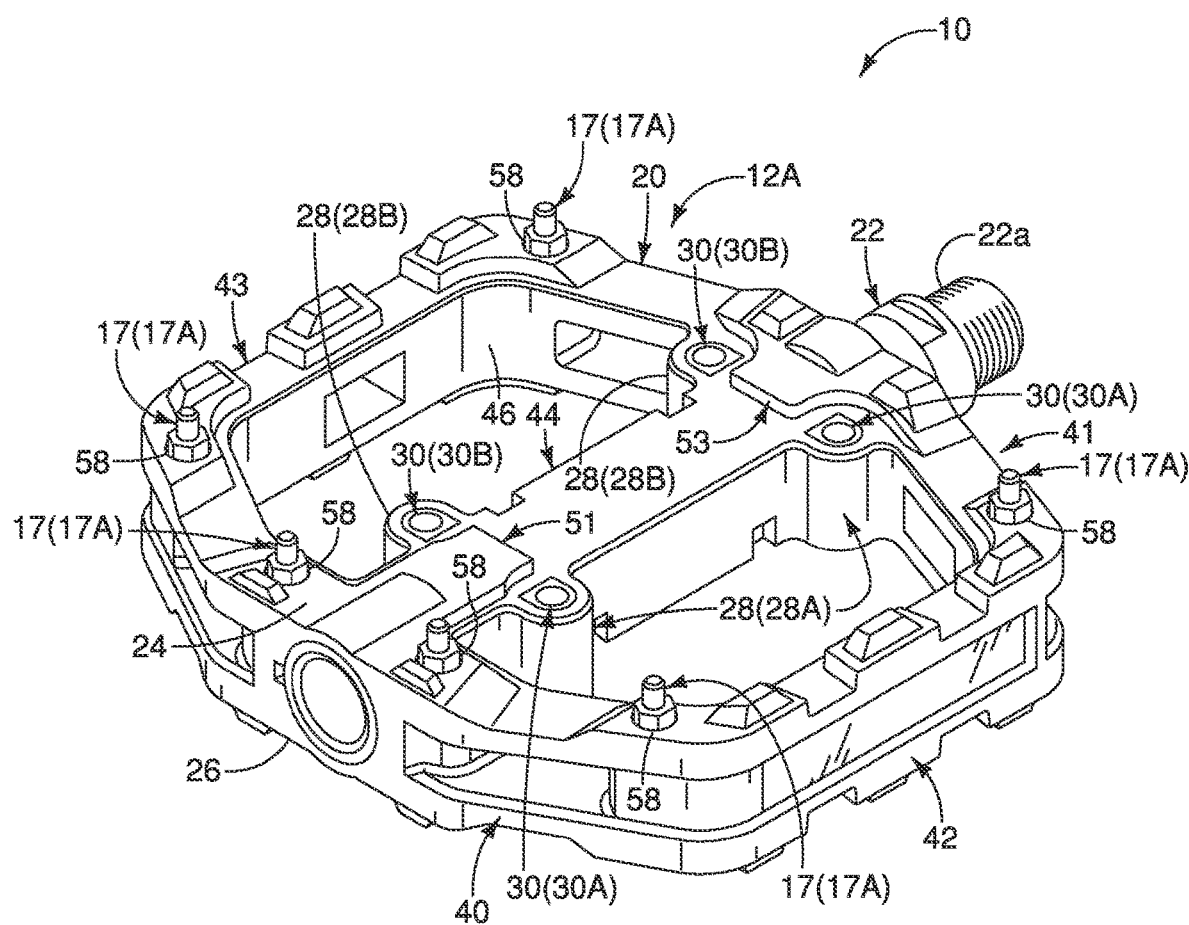
FIG. 21 is a bottom side perspective view of the pedal assembly having the spike pins attached to the pedal body as illustrated in FIGS. 19 and 20.
Figure 22:
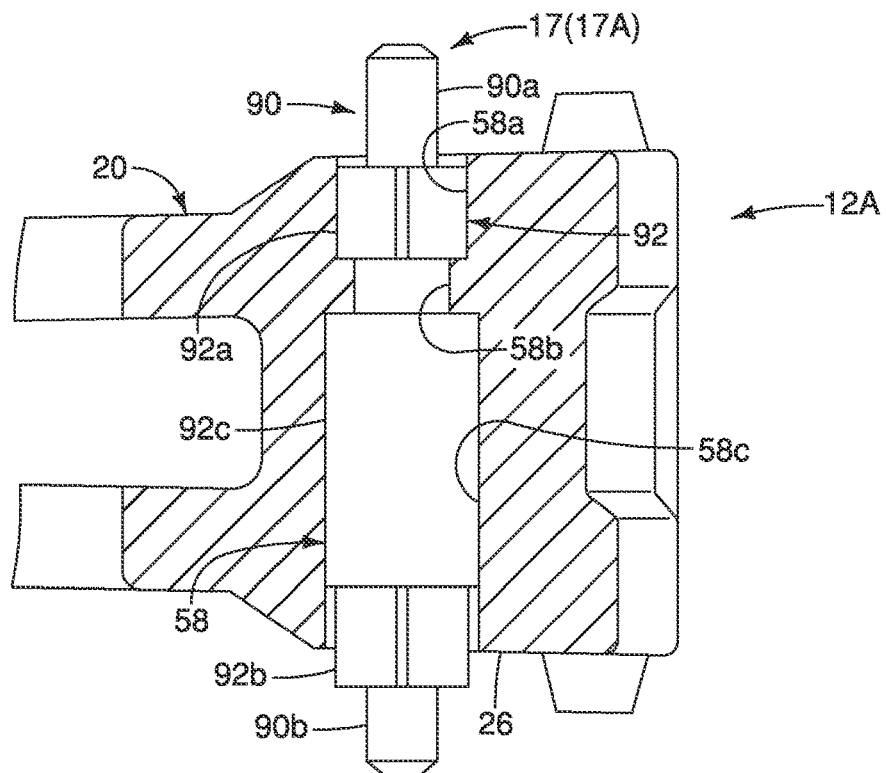
FIG. 22 is a cross-sectional view of the pedal body illustrated in FIGS. 17 and 18 as seen along section line 22-22 of FIG. 20 where the spike pin is shown in elevation.
Figure 23:
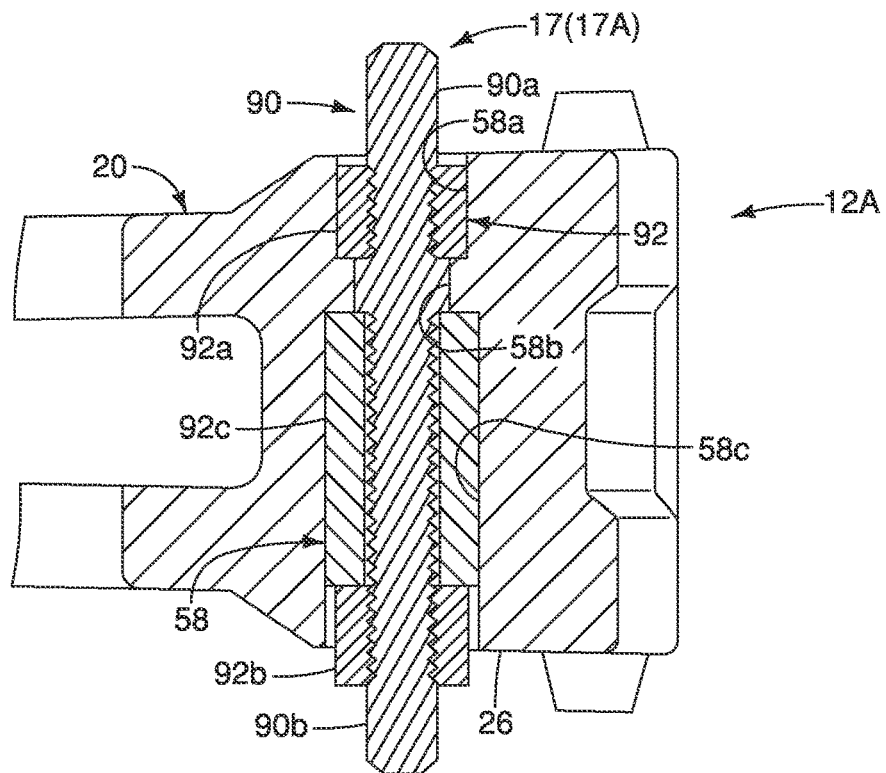
FIG. 23 is a cross-sectional view, similar to FIG. 22, of the pedal body but where the spike pin is shown in cross-section.
Figure 24:
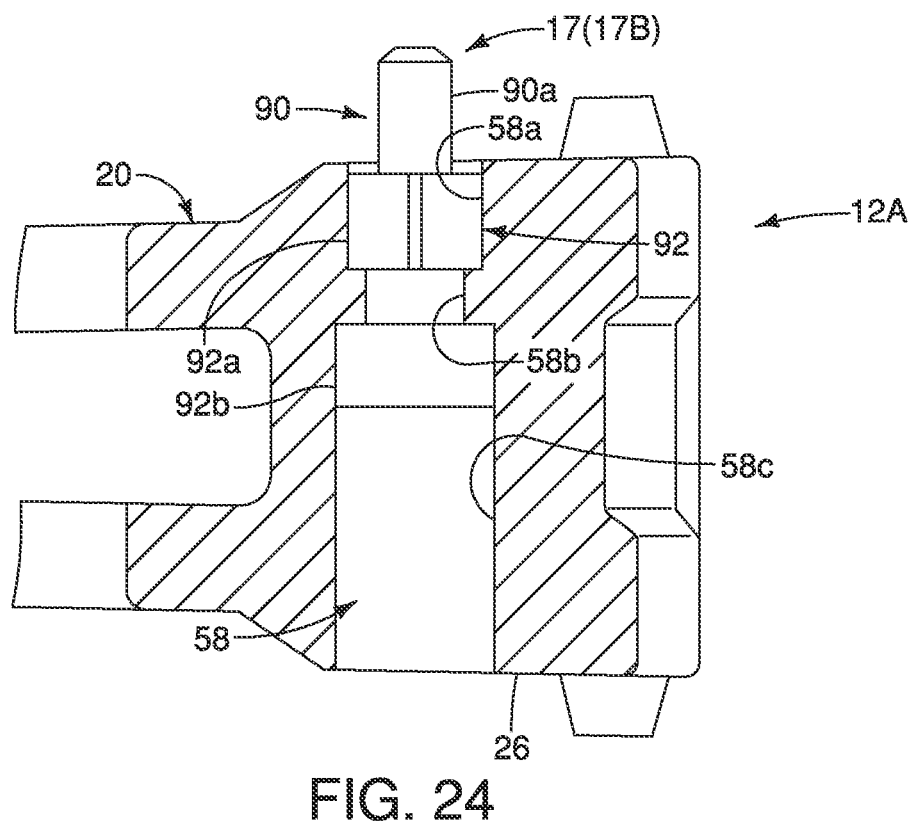
FIG. 24 is a cross-sectional view, similar to FIG. 22, of the pedal body but where a single side spike pin is install and shown in elevation.
Figure 25:
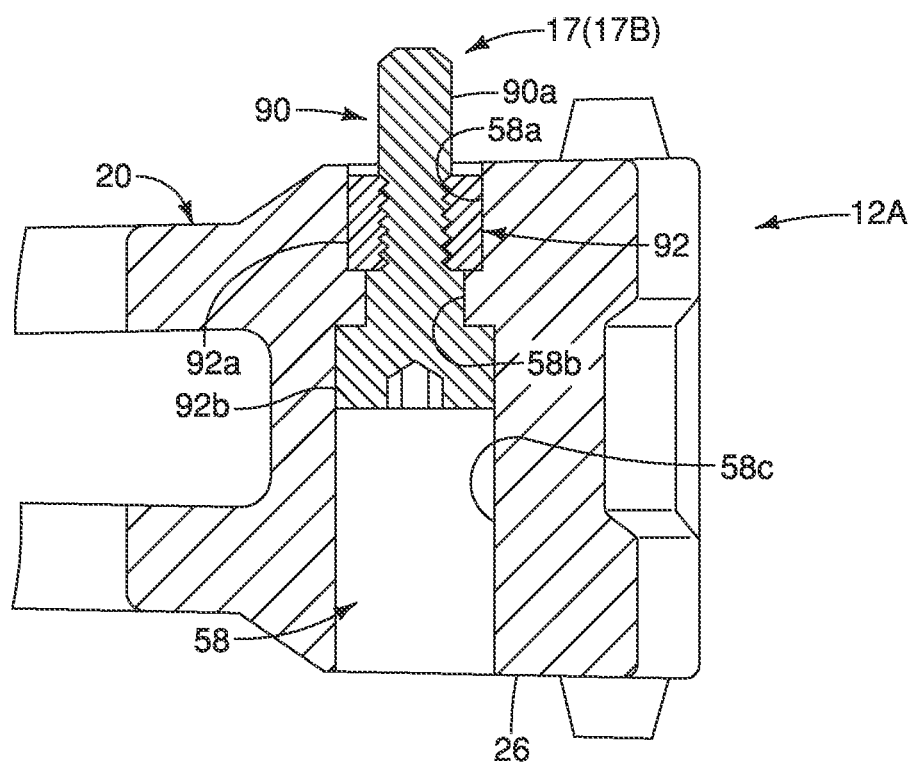
FIG. 25 is a cross-sectional view, similar to FIG. 24, of the pedal body but where the single side spike pin is shown in cross-section.

In the illustrated embodiment, as seen in FIGS. 3, 6, 12, 16 and 20, the plurality of pedal components includes at least a pair of the cleat coupling units 14, the toe-clip 15, the friction pad 16 and the plurality of spike pins 17. For example, as illustrated in FIGS. 6 to 8, the plurality of pedal components includes the cleat coupling unit 14. For example, as illustrated in FIGS. 12 to 15, the plurality of pedal components includes the toe-clip 15. Also, for example, as illustrated in FIGS. 16 to 18, the plurality of pedal components includes the friction pad 16 (see FIGS. 11 to 18). Moreover, for example, as illustrated in FIGS. 19 to 25, the plurality of pedal components includes the spike pins 17.

While only one of the plurality of pedal components 14, 15, 16 and 17 is illustrated as being attached to the pedal 12A at a time, it will be apparent to those skilled in the art from this disclosure that two or more of the plurality of pedal components 14, 15, 16 and 17 can be simultaneously attached to the pedal 12A. For example, the cleat coupling unit 14 can be attached to one side of the pedal 12A, while the toe-clip 15 or the friction pad 16 is attached to the other side of the pedal 12A. Also, for example, the friction pad 16 and the spike pins 17 can both be attached to one and/or both sides of the pedal 12A.

The pedal 12B is also configured so that a dealer and/or user can easily customize the pedal 12B in the same manner as the pedal 12A. More specifically, the pedal 12B is configured so that a plurality of pedal components can be selectively coupled thereto as needed and/or desired. The pedal 12B are identical to each other except for as explained below. Thus, the description of the pedal 12A applies to the pedal 12B unless stated otherwise. For the sake of brevity, only the pedal 12A will be described and illustrated in detail herein.

Here, as illustrated in FIG. 1, the pedal 12A and the pedal 12B are configured as step-in pedals. However, as explained below, the pedal 12A and the pedal 12B are modular pedals that can be customized by a dealer or a user to a variety of configurations. In the case where the pedal 12A and the pedal 12B are configured as step-in pedals, the pedal assembly 10 comprises a cleat coupling unit 14. The cleat coupling unit 14 is configured to releasably engage a cleat 18 attached to a bottom of a shoe S in a conventional manner such as using a plurality of fasteners (e.g., screws). Here, the pedal 12A and the pedal 12B are configured as double-sided step-in pedals. Thus, each of the pedal 12A and the pedal 12B includes a pair of the cleat coupling units 14 where the pedal 12A and the pedal 12B are configured as double-sided step-in pedals. However, as explained below, the cleat coupling units 14 can be selectively removed from the pedal 12A and the pedal 12B as needed and/or desired. The cleat coupling units 14 can be replaced with other pedal components or used in conjunction with one or more pedal components as needed and/or desired.

Figure 3:
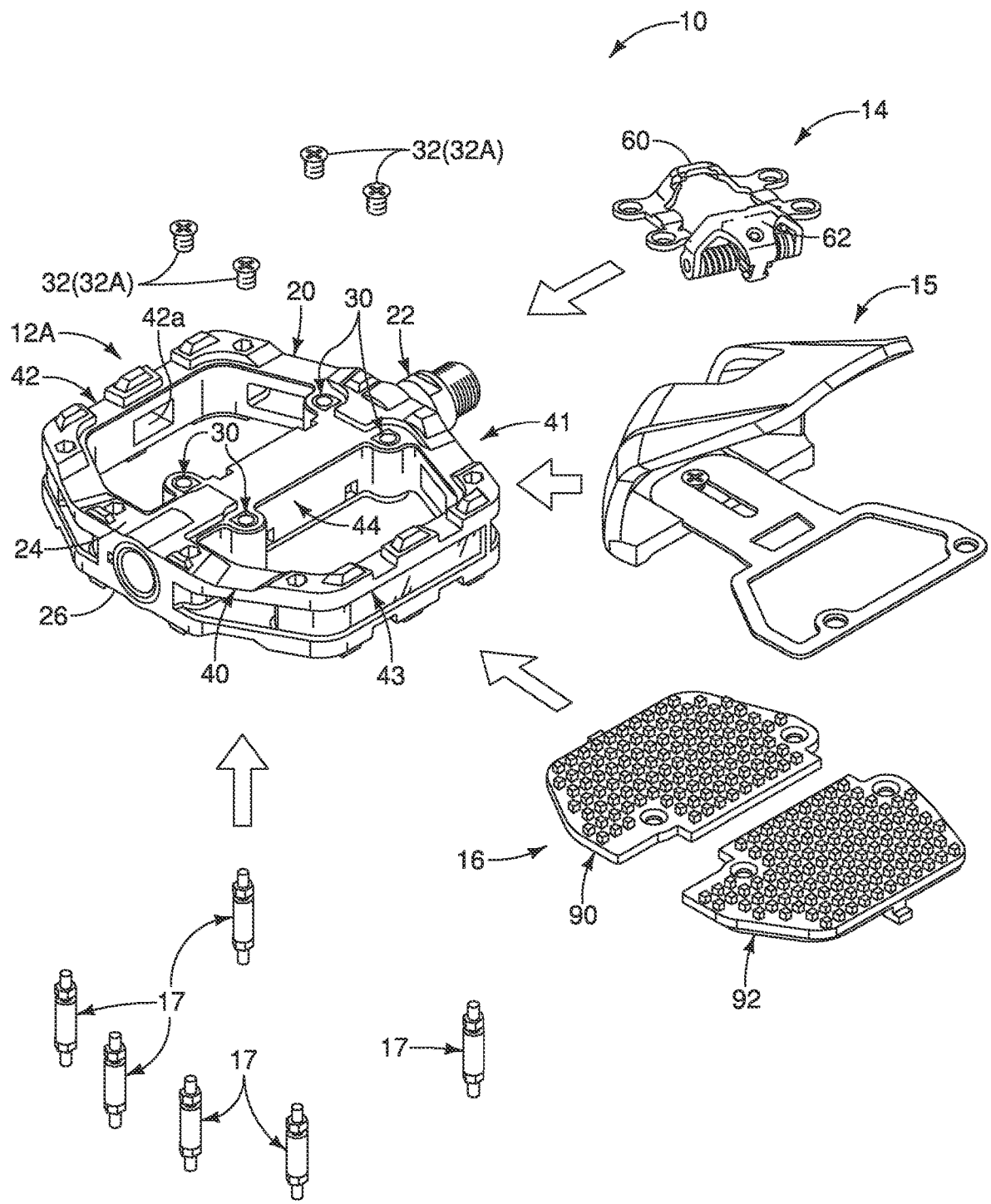
FIG. 3 is a perspective view of the pedal assembly including a plurality of pedal components such as a cleat coupling unit, a toe-clip, a friction pad and a plurality of spike pins which can be interchanged and selectively attached to the pedal by a dealer and/or user to customize the pedal in accordance with the first embodiment of the present disclosure.
Figure 4:
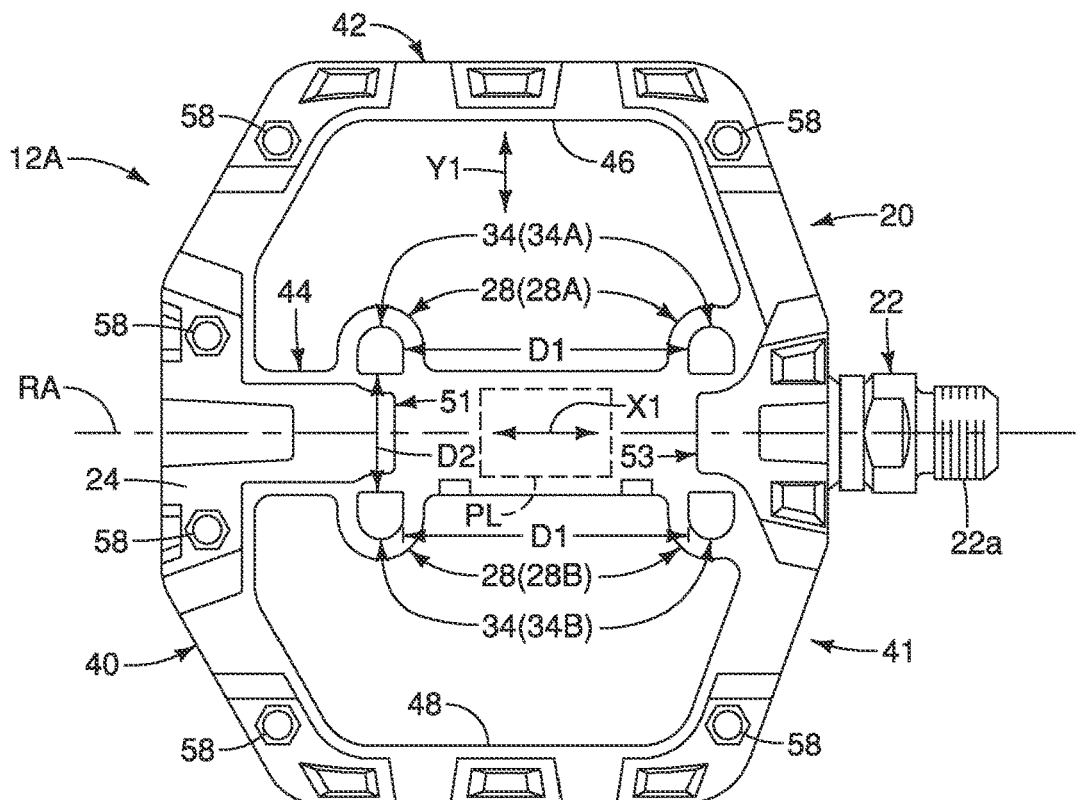
FIG. 4 is a top plan view of the pedal of the pedal assembly illustrated in FIG. 3 where the adapters have omitted.
Figure 5:
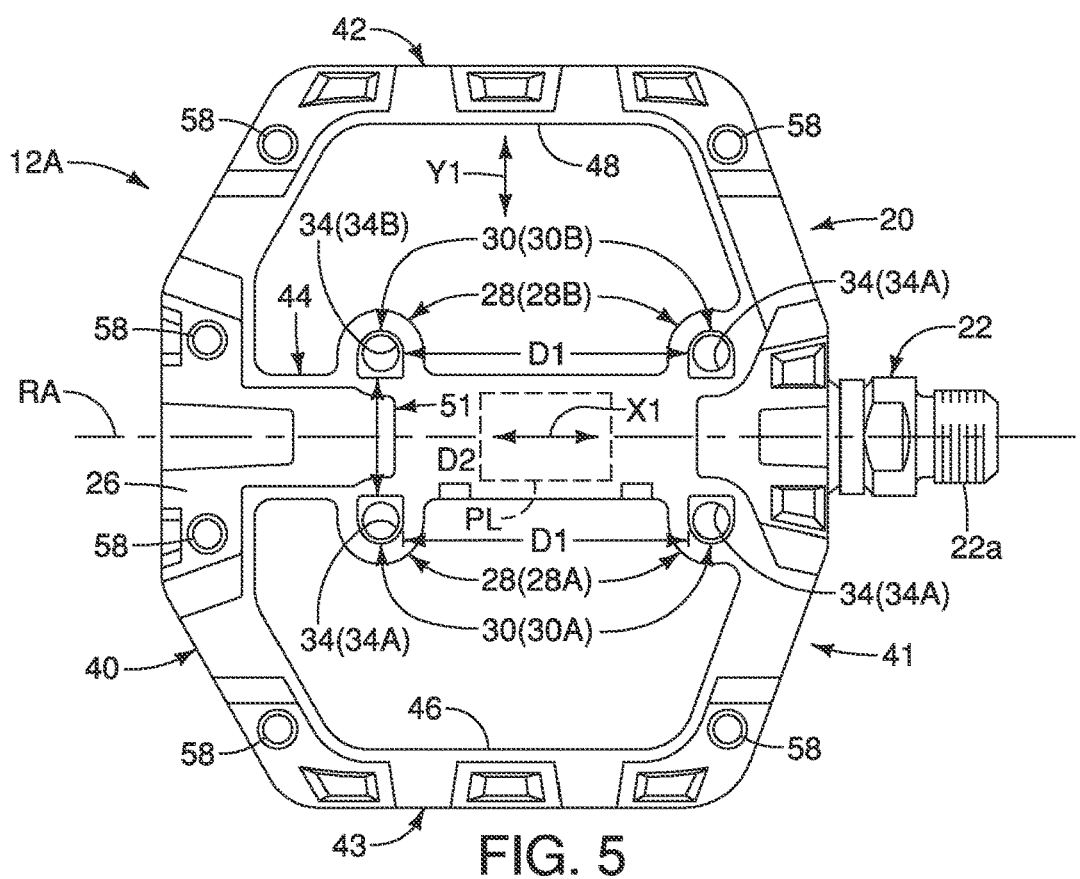
FIG. 5 is a top plan view of the pedal illustrated in FIGS. 3 and 4 where the adapters have been installed.

Basically, referring to FIGS. 3 to 5, the pedal 12A of the pedal assembly 10 comprises a pedal body 20. The pedal 12A of the pedal assembly 10 further comprises a pedal axle 22. The pedal axle 22 has a rotational center axis RA. The pedal body 20 is rotatably supported with respect to the pedal axle 22 to rotate around the rotational center axis RA. The plurality of pedal components are configured to be selectively attached to the pedal body 20. For example, as seen in FIGS. 3 to 5, the plurality of pedal components includes at least the cleat coupling unit 14. In a first configuration of the pedal 12A, two of the cleat coupling units 14 are attached to the pedal body 20. However, it will be apparent from this disclosure that one or both of the cleat coupling units 14 can be detached and replaced with a different pedal component. As explained later, the plurality of pedal components can include one or two of the cleat coupling units 14 (see FIGS. 6 to 8), the toe-clip 15 (see FIGS. 11 to 15), one or two the friction pad 16 (see FIGS. 16 to 19) and one or more of the spike pins 17 (see FIGS. 20 to 25).

The pedal axle 22 is a rigid member that rotatably supports the pedal body 20 in a conventional manner. The pedal axle 22 is preferably made of a hard rigid material such as a metallic material or a fiber reinforced material. The pedal axle 22 has an externally threaded section 22a and a support section 22b. The externally threaded section 22a includes a left-hand thread that is configured to be screwed into the crank arm CA2 on the left side of the human-powered vehicle V. The support section 22b serves to rotatably support the pedal body 20 via one or more bearings. In the case of the pedal axle of the pedal 12A, the pedal axle has an externally threaded section having a right-hand thread.

The pedal body 20 is a rigid member that is rotatably supported on the pedal axle 22. The pedal body 20 is preferably made of a hard rigid material such as a metallic material or a fiber reinforced material. The pedal body 20 has a first shoe-disposing surface 24 and a second shoe-disposing surface 26 opposite to the first shoe-disposing surface 24. As described below, both of the first shoe-disposing surface 24 and the second shoe-disposing surface 26 are configured so that a plurality of pedal components different from each other are selectively attachable to each of the first shoe-disposing surface 24 and the second shoe-disposing surface 26. Here, the first shoe-disposing surface 24 and the second shoe-disposing surface 26 are substantially identical.

Preferably, as seen in FIGS. 4 and 5, the pedal body 20 includes at least one adapter receiving portion 28. The pedal assembly 10 further comprises at least one adapter 30. Basically, the at least one adapter receiving portion 28 is configured to receive the at least one adapter 30 engaging with at least one fastening member 32 so that a plurality of pedal components different from each other can be mounted to the pedal body 20 through the at least one adapter 30. In other words, the pedal assembly 10 further comprises the at least one adapter 30. The at least one adapter 30 non-rotatably coupled to the at least one adapter receiving portion 28. In particular, the at least one adapter receiving portion 28 has a non-circular shape corresponding to an external shape of the at least one adapter 30. In this way, the at least one adapter 30 is non-rotatably coupled to the at least one adapter receiving portion 28. Preferably, the non-circular shape includes one of an oval shape, a D shape, a polygon shape and a quadrant shape. In the illustrated embodiment, the non-circular shape of the at least one adapter receiving portion 28 is a D shape, and the non-circular shape of the at least one adapter 30 is a D shape. Moreover, the pedal assembly 10 further comprises the at least one fastening member 32 detachably coupled to the at least one adapter 30. In this way, the plurality of pedal components are configured to be selectively coupled to the at least one adapter receiving portion 28 of the pedal body 20 using the at least one fastening member 32.

Preferably, the at least one adapter receiving portion 28 includes a plurality of adapter receiving portions 28. Thus, the at least one adapter 30 includes a plurality of adapters 30. Each of the plurality of adapter receiving portions 28 is configured to receive at least one of the plurality of adapters 30. Preferably, the adapters 30 are press fitted into the adapter receiving portions 28. The adapters 30 can be made of the same material as the adapter receiving portions 28, or can be made of a different material as the adapter receiving portions 28. In the illustrated embodiment, the at least one adapter receiving portion 28 includes a first adapter receiving portion 28A and a second adapter receiving portion 28B. The first adapter receiving portion 28A is configured to receive at least one first adapter 30A of the at least one adapter 30. The second adapter receiving portion 28B is configured to receive at least one second adapter 30B of the at least one adapter 30.

In the illustrated embodiment, the at least one adapter receiving portion 28 includes a plurality of fastening holes 34. The plurality of fastening holes 34 extend completely through the pedal body 20 from the first shoe-disposing surface 24 of the pedal body 20 to the second shoe-disposing surface 26 of the pedal body 20. Each of the plurality of fastening holes 34 is configured to receive an adapter of the at least one adapter 30. More specifically, in the illustrated embodiment, the first adapter receiving portion 28A has a pair of first fastening holes 34A of the plurality of fastening holes 34. The second adapter receiving portion 34B has a pair of second fastening holes 34B of the plurality of fastening holes 34. Thus, here, the first adapter receiving portion 28A is configured to receive a pair of the first adapters 30A, and the second adapter receiving portion 28B is configured to receive a pair of the second adapters 30B.

In the illustrated embodiment, each of the at least one adapter 30 has a first shoe-disposing side opening 36A configured to receive a first fastening member 32A of the least one fastening member 32 and a second shoe-disposing side opening 36B configured to receive a second fastening member 32B of the least one fastening member 32. The first shoe-disposing side opening 36A is positioned at the first shoe-disposing surface 24. The second shoe-disposing side opening 36B is positioned at the second shoe-disposing surface 26.

Figure 9:
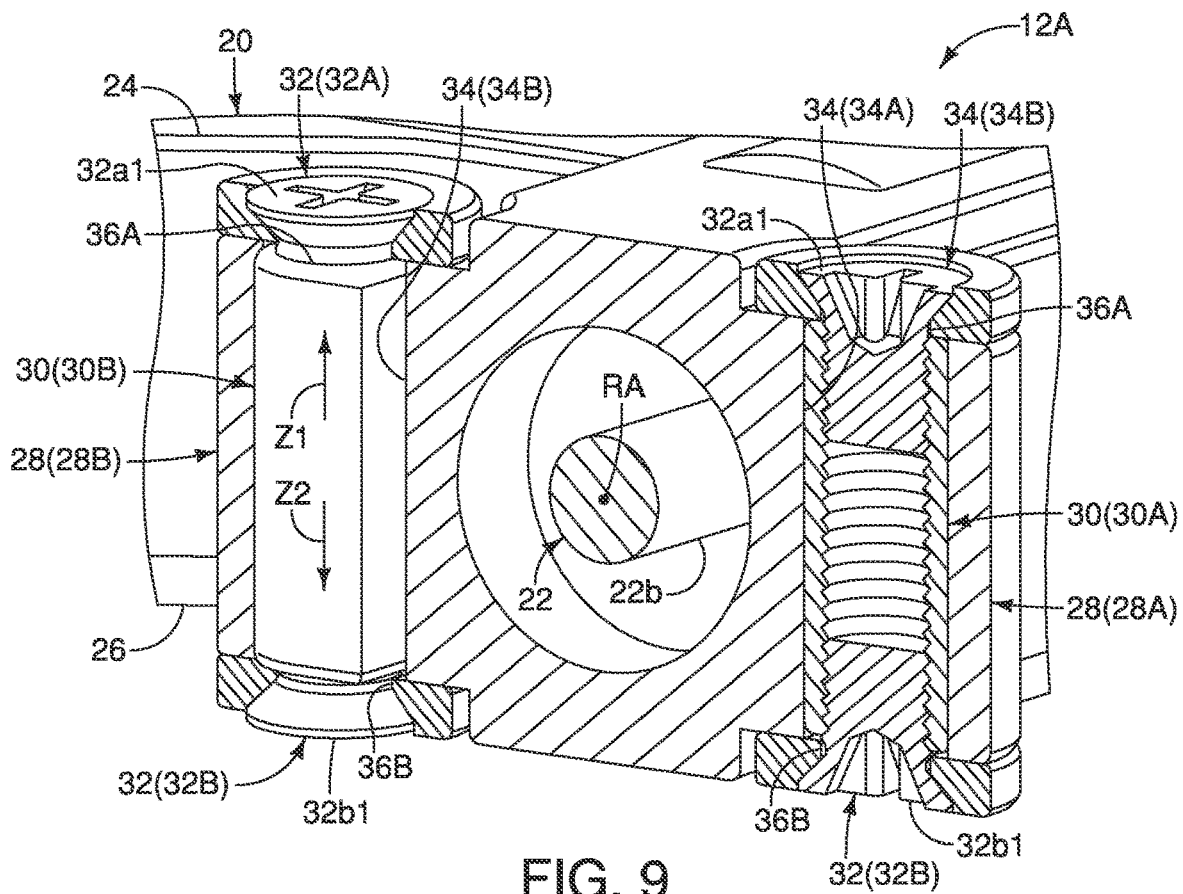
FIG. 9 is a partial cross-sectional view of the pedal assembly illustrated in FIG. 4 as seen along section line 9-9 of FIG. 7.
Figure 10:
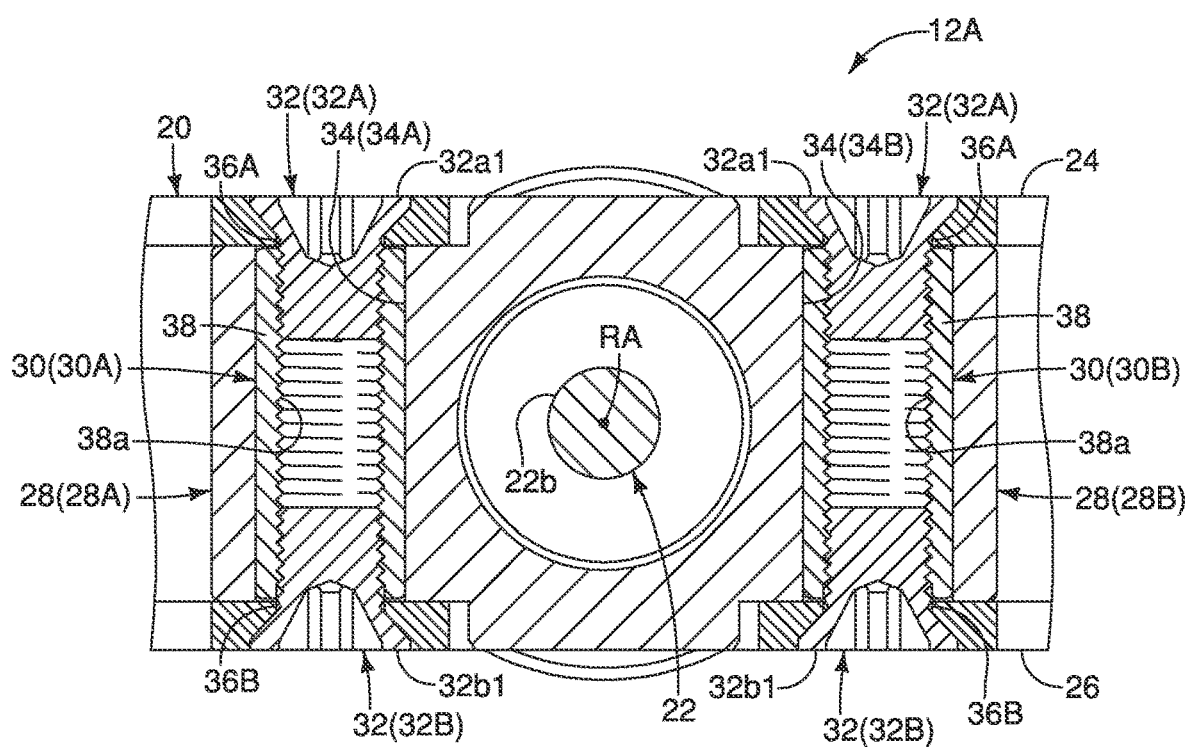
FIG. 10 is a partial cross-sectional view of the pedal assembly illustrated in FIG. 4 as seen along section line 10-10 of FIG. 7.

As seen in FIGS. 9 and 10, the first fastening holes 34A extend completely through the pedal body 20 from the first shoe-disposing surface 24 to the second shoe-disposing surface 26. The second fastening holes 34B extend completely through the pedal body 20 from the first shoe-disposing surface 24 to the second shoe-disposing surface 26. One of the plurality of adapters 30 is disposed in each of the pair of first fastening holes 34A and the pair of second fastening holes 34B. Here, the first fastening holes 34A receive the first adapters 30A, and the second fastening holes 34B receive the second adapters 30B.

In the illustrated embodiment, the at least one fastening member 32 includes the plurality of fastening members 32. In particular, as mentioned above, the fastening members 32 include the first fastening member 32A and the second fastening member 32B. The first fastening member 32A and the second fastening member 32B are all identical and can be interchanged. Also, depending on the pedal component being attached to the pedal body 20, some of the first fastening member 32A and/or the second fastening member 32B may not be used.

Referring to FIGS. 9 and 10, the plurality of fastening members 32 include a first protrusion 32$a1$ and a second protrusion 32$b1$. The first protrusion 32$a1$ is configured to restrict movement of the at least one adapter 30 in a first direction Z1 with respect to the at least one adapter receiving portion 28. The second protrusion 32$b1$ is configured to restrict movement of the at least one adapter 30 in a second direction Z2 with respect to the at least one adapter receiving portion 28. The second direction Z2 is different from the first direction Z1. Here, the first protrusion 32$a1$ are provided by the first fastening members 32A and the second protrusion 32$b1$ are provided by the second fastening member 32B. More specifically, the first fastening members 32A are each screws in which the first protrusion 32$a1$ corresponds to a head portion of the screw. Likewise, the second fastening member 32B are each screws in which the second protrusion 32$b1$ corresponds to a head portion of the screw.

Figure 11:
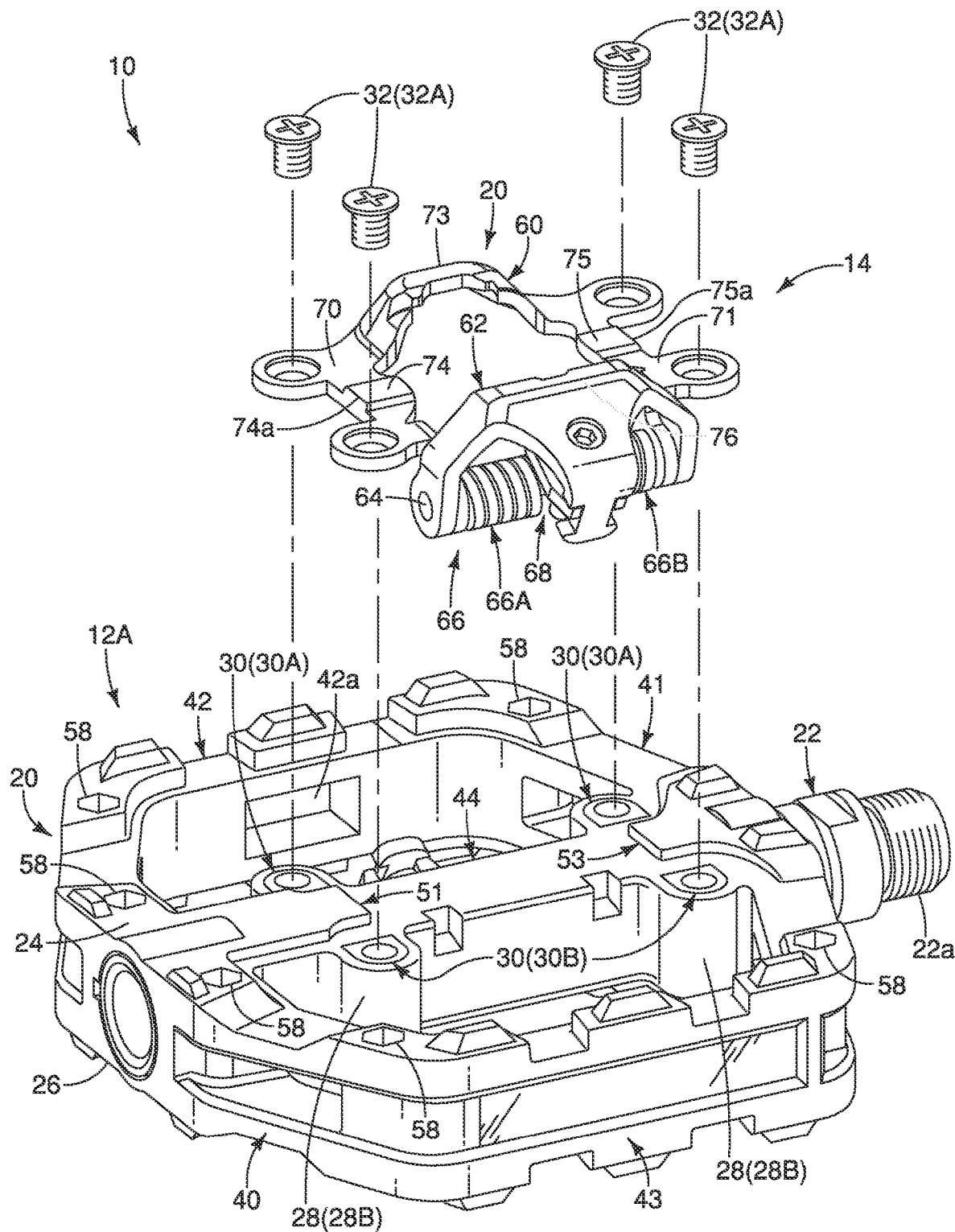
FIG. 11 is a perspective view of the pedal assembly illustrated in FIGS. 6 to 8 where one of the coupling units is arranged to be attached to the pedal body.
Figure 12:
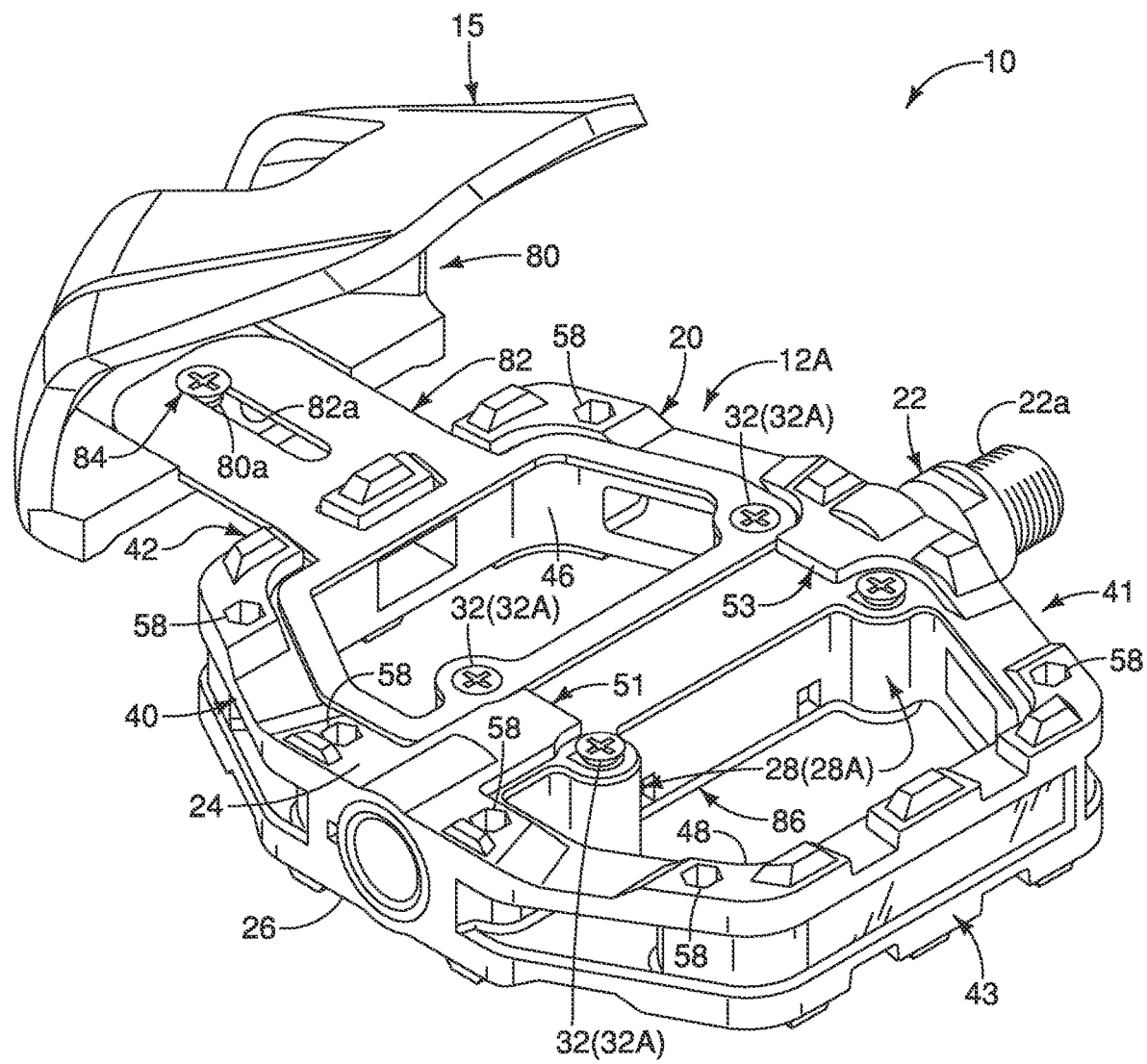
FIG. 12 is a top side perspective view of the pedal assembly where the toe-clip has been attached to the pedal body illustrated in FIG. 5 by the adapters.
Figure 13:
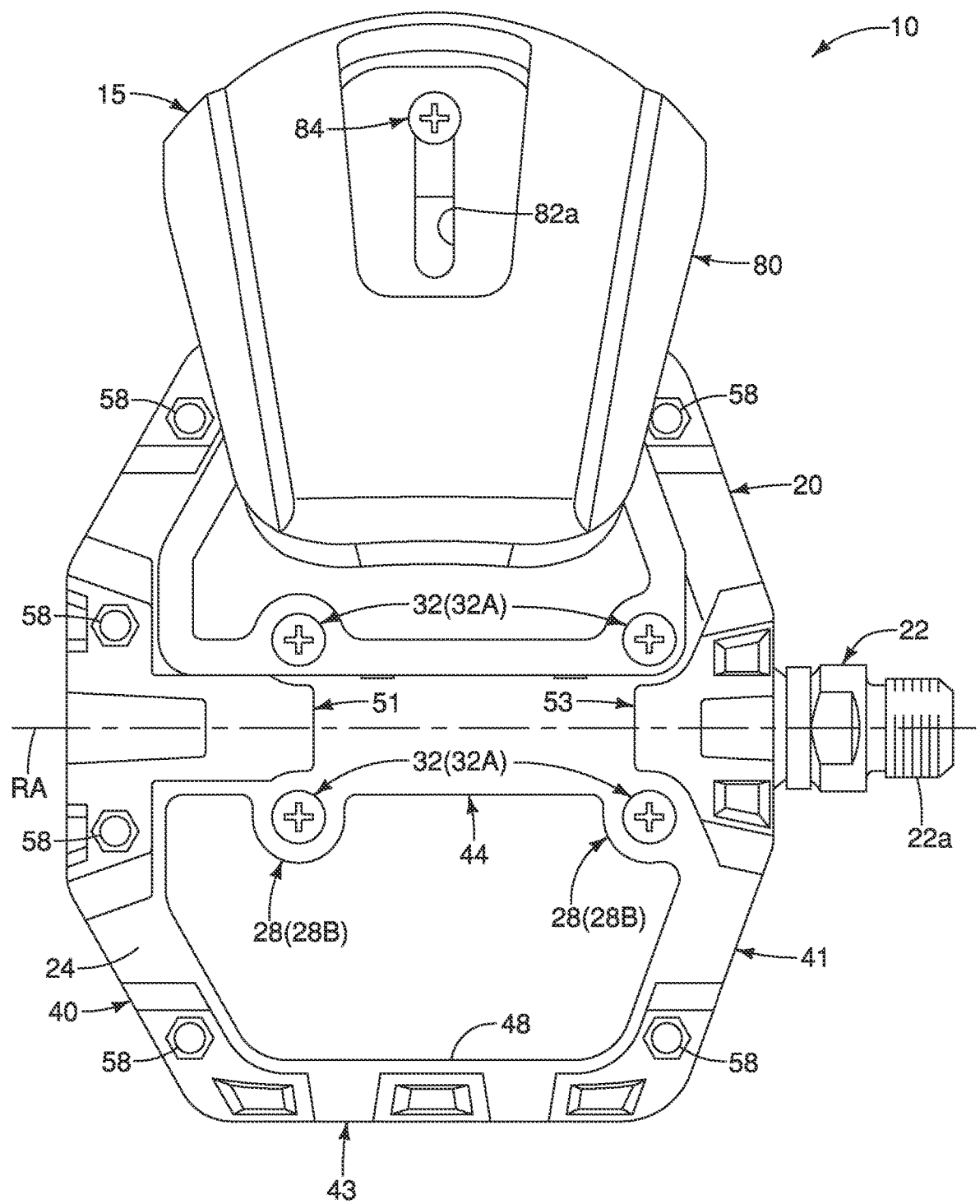
FIG. 13 is a top plan view of the pedal assembly illustrated in FIG. 12.

Referring to FIGS. 9 and 10, the adapter 30 comprises an adapter body 38. The adapter body 38 has at least one threaded hole 38$a$. The at least one threaded hole 38$a$ is configured to engage with at least one fastening member 32. The adapter body 38 has a non-circular shape in a cross-section view. The non-circular shape of the adapter body 38 corresponds to a non-circular shape of the adapter receiving portion 28 of the pedal body 20 of the pedal assembly 10. Specifically, as seen in FIG. 11, in the illustrated embodiment, the threaded hole 38$a$ have a D-shape in a cross-section view, and the fastening holes 34 of the adapter receiving portion 28 also each have a D-shape in a cross-section view.

In the illustrated embodiment, the pedal assembly 10 comprises the plurality of adapters 30. Also, the pedal body 20 includes the plurality of fastening holes 34. Preferably, the plurality of fastening holes 34 extend through the pedal body 20 from the first shoe-disposing surface 24 to the second shoe-disposing surface 26. The plurality of adapters 30 are disposed inside the plurality of fastening holes 34 so that at least one pedal component can be mounted to the pedal body 20 through the plurality of adapters 30. The adapter 30 is provided for the pedal assembly 10 that is configured to be used with a human powered vehicle 10. The adapter 30 is configured to be received in the adapter receiving portion 28 of the pedal body 20 of the pedal assembly 10.

Referring back to FIGS. 4 and 5, the pedal body 20 includes an outer body portion 40, an inner body portion 41, a first body portion 42, a second body portion 43 and an intermediate body portion 44. The pedal first body portion 42 extends in the axial direction X1. The second body portion 43 extends in the axial direction X1. The intermediate body portion 44 is configured to receive the pedal axle 22 and extends in the axial direction X1. An axial direction X1 of the pedal 12A refers to a direction parallel to the rotational center axis RA. The outer body portion 40 extends in a longitudinal direction Y1. A longitudinal direction Y1 of the pedal 12A refers to a direction perpendicular to the rotational center axis RA, and parallel to a reference plane PL passing through the rotational center axis RA and bisecting the pedal body 20. The inner body portion 41 extends in the longitudinal direction Y1. The first body portion 42 extends in the axial direction X1. The second body portion extends in the axial direction X1. The intermediate body portion 44 is configured to receive the pedal axle 22 and extends in the axial direction X1. The intermediate body portion 44 is positioned between the outer body portion 40 and the inner body portion 41 and between the first body portion 42 and the second body portion 43. Here, the outer body portion 40, the inner body portion 41, the first body portion 42, the second body portion 43 and the intermediate body portion 44 are integrally formed as a one-piece member. Preferably, as in the illustrated embodiment, the outer body portion 40, the inner body portion 41, the first body portion 42 and the second body portion 43 are connected together to form an annular tread cage. The intermediate body portion 44 is connected to the outer body portion 40 and the inner body portion 41 to divide the pedal body 20 into a first body portion and a second body portion.

As seen in FIGS. 4 and 5, the first shoe-disposing surface 24 and the second shoe-disposing surface 26 are defined by the outer body portion 40, the inner body portion 41, the first body portion 42, the second body portion 43 and the intermediate body portion 44. The at least one adapter receiving portion 28 is provided to the intermediate body portion 44. Preferably, the outer body portion 40, the inner body portion 41, the first body portion 42, and the intermediate body portion 44 define a first opening 46. Also, preferably, the outer body portion 40, the inner body portion 41, the second body portion 43, and the intermediate body portion 44 define a second opening 48. The first opening 46 is opposite to the second opening 48 with respect to the intermediate body portion 44.

In the illustrated embodiment, the plurality of fastening holes 34 includes a pair of the first fastening holes 34A on a first side of the intermediate body portion 44. Also, in the illustrated embodiment, the plurality of fastening holes 34 includes a pair of the second fastening holes 34B on a second side of the intermediate body portion 44. The second side is opposite to the first side. The first fastening holes 34A are spaced apart from each other in the axial direction X1 by a first distance D1. The second fastening holes 34B are spaced apart from the first fastening holes 34A in a direction perpendicular to the axial direction X1 by a second distance D2 different from the first distance D1. In this embodiment, seen in FIGS. 4 and 5, the second distance D2 is smaller than the first distance D1. The second fastening holes 34B are spaced apart from each other in the axial direction X1 by the first distance D1.

As seen in FIGS. 7 and 8, the cleat coupling units 14 are attached to the first shoe-disposing surface 24 and the second shoe-disposing surface 26 on the intermediate body portion 44. In particular, the intermediate body portion 44 includes the plurality of fastening holes 34 extending through the pedal body 20 from the first shoe-disposing surface 24 to the second shoe-disposing surface 26. On the other hand, the first body portion 42 and the second body portion 43 are free from a cleat engagement portion.

As seen in FIGS. 7 and 8, at least one of the outer body portion 40, the inner body portion 41, the first body portion 32 and the intermediate body portion 44 includes a first positioning profile 51 disposed on the first shoe-disposing surface 24 and a second positioning profile 52 disposed on the second shoe-disposing surface 26. Here, the intermediate body portion 44 includes the first positioning profile 51 disposed on the first shoe-disposing surface 24, and the second positioning profile 52 disposed on the second shoe-disposing surface 26. Preferably, at least one of the outer body portion 40, the inner body portion 41, the second body portion 43 and the intermediate body portion 44 includes a third positioning profile 53 disposed on the first shoe-disposing surface 24 and a fourth positioning profile 54 disposed on the second shoe-disposing surface 26. Here, the intermediate body portion 44 includes the third positioning profile 53 disposed on the first shoe-disposing surface 24, and the fourth positioning profile 54 disposed on the second shoe-disposing surface 26.

The first positioning profile 51 and the third positioning profile 53 are spaced apart in the axial direction X1 on the intermediate body portion 44 to form a coupling unit receiving space therebetween to receive the cleat coupling unit 14. The first positioning profile 51 and the third positioning profile 53 are configured to mate with the cleat coupling unit 14 where the cleat coupling unit 14 is attached to the first shoe-disposing surface 24.

The second positioning profile 52 and the fourth positioning profile 54 are spaced apart in the axial direction X1 on the intermediate body portion 44 to form a coupling unit receiving space therebetween to receive the cleat coupling unit 14. The second positioning profile 52 and the fourth positioning profile 54 are configured to mate with the cleat coupling unit 14 where the cleat coupling unit 14 is attached to the second shoe-disposing surface 26.

As seen in FIGS. 4 and 5, at least one of the outer body portion 40, the inner body portion 41, the first body portion 32, the second body portion 43 includes at least one third fastening hole 58 formed to the pedal body 20 from the first shoe-disposing surface 24 toward the second shoe-disposing surface 26. Here, the at least one third fastening hole 58 includes a plurality of third fastening holes 58. In particular, in the illustrated embodiment, the third fastening holes 58 are formed in the outer body portion 40 and the inner body portion 41. More specifically, the outer body portion 40 has four of the third fastening holes 58, and the inner body portion 41 has two of the third fastening holes 58. Of course, it will be apparent from this disclosure that the third fastening holes 58 can be provided to the first body portion 32, the second body portion 43. More over, it will be apparent from this disclosure that the third fastening holes 58 can be provided in a different pattern then the illustrated pattern.

Now, the cleat coupling unit 14 will be described in further detail with reference to FIGS. 7 to 11. The cleat coupling unit 14 basically includes a first coupling member 60 and a second coupling member 62. The first coupling member 60 is configured to be attached to the pedal body 20 of the pedal assembly 10. The second coupling member 62 is coupled to the first coupling member 60. In particular, the cleat coupling unit 14 further includes a shaft 64. The second coupling member 62 is pivotally coupled to the first coupling member 60 by the shaft 64. In particular, the second coupling member 62 is pivotable between a cleat holding position and a cleat non-holding position. Here, the cleat coupling unit 14 further includes a biasing member 66. The biasing member 66 biases the second coupling member 62 towards the cleat holding position.

The first coupling member 60 is configured to releasably couple the cleat 18 to the cleat coupling unit 14. The second coupling member 62 is configured to releasably couple the cleat 18 to the cleat coupling unit 14. The second coupling member 62 is pivotable between a cleat holding position and a cleat non-holding position.

The cleat coupling unit 14 further comprises a biasing force adjuster 68 disposed between the biasing member 66 and the second coupling member 62. The biasing member 66 biases the second coupling member 62 towards the cleat holding position. The biasing force adjuster 68 adjusts the biasing force applied to the second coupling member 62 by the biasing member 66. The biasing member 66 is disposed on the shaft 64. In the illustrated embodiment, the biasing member 66 includes a plurality of springs 66A and 66B. The springs 66A and 66B are operatively disposed between the first coupling member 60 and the second coupling member 62. Each of the plurality of springs includes a coil portion disposed on the shaft 64, a first leg portion extending from one end of the coil portion, and a second leg portion extending from the other end of the coil portion. The springs 66A and 66B are configured as that the first leg portions contact the first coupling member 60, while the second leg portions contact the biasing force adjuster 68.

The biasing force adjuster 68 basically includes an adjustment screw and an adjustment nut. The adjustment screw has a head portion that is engaged in an opening of the second coupling member 62 and a threaded shaft that is threadedly engaged with the adjustment nut. The second leg portions of the springs 66A and 66B contact the adjustment nut. By rotating the adjustment screw, the adjustment nut moves along the threaded shaft of the adjustment screw to either increase or decrease the biasing force applied to the second coupling member 62 by the springs 66A and 66B. Since biasing force adjusters are well known in pedals, the biasing force adjuster 68 will not be described in further detail herein.

In the illustrated embodiment, as seen in FIGS. 7 to 11, the cleat coupling unit 14 is attached to the pedal body 20 by four of the fasteners 32 (32A) that are threaded into four of the adapters 30 (30A). In the illustrated embodiment, the cleat coupling unit 14 can be mounted to either the first shoe-disposing surface 24 of the pedal body 20, or the cleat coupling unit 14. Moreover, a pair of the cleat coupling units 14 can be attached to the pedal body 20. More specifically, the first coupling member 60 includes a first pedal mounted portion 71, a second pedal mounted portion 72 and a cleat engagement portion 73. Also, the first coupling member 60 includes an outer portion 74 and an inner portion 75. Both of the outer portion 74 and the inner portion 72 curve toward each other. In particular, the outer portion 74 includes an outer engagement recess 74a that is configured to engage with the positioning profile 51 or 52 of the pedal body 20. The inner portion 75 includes an inner engagement recess 75a configured to engage with the positioning profile 53 or 54 of the pedal body 20.

The cleat engagement portion 73 connects the first pedal mounted portion 76 and the second pedal mounted portion 78. The cleat engagement portion 73 is configured to engage a front end of the cleat 18. Specifically, the cleat engagement portion 73 is configured to abut against the cleat 18 to restrict movement of the cleat 18 away from the pedal body 20, and to restrict forward movement of the cleat 18 with respect to the pedal body 20.

The second coupling member 62 is pivotable about the shaft 64. The second coupling member 62 includes a cleat engagement portion 76. The cleat engagement portion 76 is configured to engage a rear end of the cleat 18. Specifically, the cleat engagement portion 76 is configured to abut against the cleat 18 to restrict movement of the cleat 18 away from the pedal body 20, and to restrict rearward movement of the cleat 18 with respect to the pedal body 20.

Figure 14:
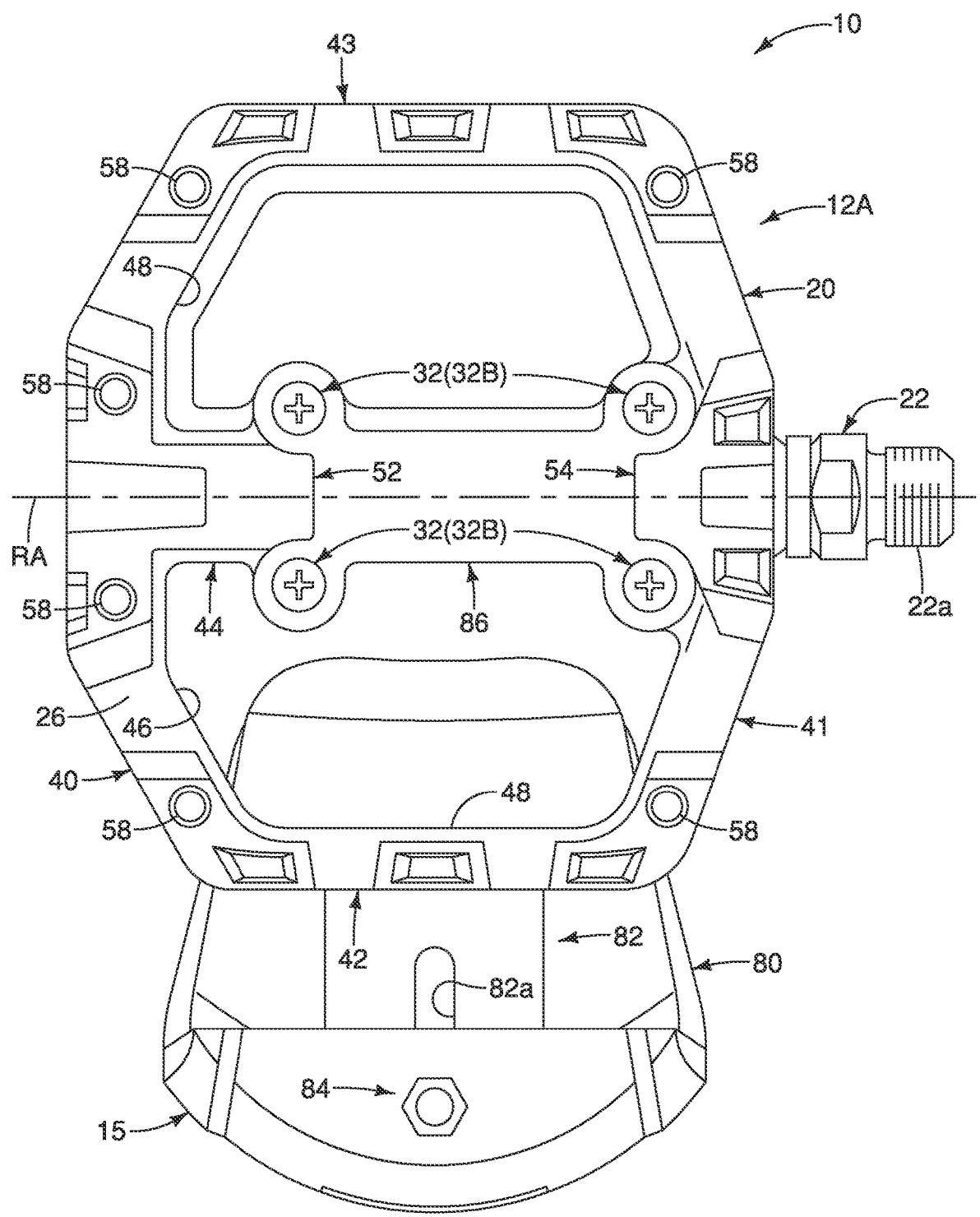
FIG. 14 is a bottom plan view of the pedal assembly illustrated in FIGS. 12 and 13.

In the illustrated embodiment, as seen in FIGS. 11 to 15, the toe clip 15 is attached to the pedal body 20 by two of the fasteners 32 (32A) that are threaded into two of the adapters 30 (30A). In the illustrated embodiment, the toe clip 15 is mounted to the first shoe-disposing surface 24 of the pedal body 20. However, the toe clip 15 can alternatively be attached to the second shoe-disposing surface 26 of the pedal body 20 in the same manner. Here, the toe clip 15 includes a cage portion 80 and a mounting portion 82. Preferably, the cage portion 80 is adjustably attached to the mounting portion 82 to adjust the position of the cage portion 80 relative to the pedal body 20. For example, the cage portion 80 is attached to the mounting portion 82 by a fastener 84 (e.g., a bolt and a nut). As seen in FIG. 15, the cage portion 80 is provided with an opening 80a, and the mounting portion 82 is provided with an elongated slot 82a. The fastener 84 passes through the opening 80a, and the elongated slot 82a. The position of the cage portion 80 relative to the pedal body 20 can be adjusted by sliding the cage portion 80 relative to the mounting portion 82 and then tightening the fastener 84 once the cage portion 80 is in the desired position. As seen in FIG. 14, optionally, a plate 86 can be attached to the opposite side of the pedal body using the two of the fasteners 32 (32B) that are threaded into two of the adapters 30 (30B).

In the illustrated embodiment, as seen in FIGS. 16 to 19, the friction pad 16 is attached to the pedal body 20 by four of the fasteners 32 (32A) that are threaded into four of the adapters 30 (30A). In the illustrated embodiment, the friction pad 16 is mounted to the first shoe-disposing surface 24 of the pedal body 20. However, the friction pad 16 can alternatively be attached to the second shoe-disposing surface 26 of the pedal body 20 in the same manner. Here, the friction pad 16 includes a first pad part 90 and a second pad part 92. The second pad part 92 is a separate piece from the first pad part 90. The first pad part 90 is configured to completely cover the first opening 46 in a state where the first pad part 90 is attached to the pedal body 20. The second pad part 92 is configured to completely cover the second opening 48 in a state where the second pad part 92 is attached to the pedal body 20.

The first pad part 90 includes a shoe contact surface 90a and a pedal body facing surface 90b. The shoe contact surface 90a is preferably provided with a plurality of protrusions for improving traction. The pedal body facing surface 90b is provided with a retaining member 90c (e.g., a tab) that is configured to engage an opening 42a in the first body portion 42 of the pedal body 20. The first pad part 90 is attached to the intermediate body portion 44 by the first fastening members 32A by the first adapters 30A. The retaining member 90c is disposed in the opening 42a and contacts the first body portion 42 of the pedal body 20 to retain the first pad part 90 to the first body portion 42. Similarly, the second pad part 92 includes a shoe contact surface 92a and a pedal body facing surface 92b. The shoe contact surface 92a is preferably provided with a plurality of protrusions for improving traction. The pedal body facing surface 92b is provided with a retaining member 92c (e.g., a tab) that is configured to engage an opening 43a in the second body portion 43 of the pedal body 20. The second pad part 92 is attached to the intermediate body portion 44 by the first fastening members 32A by the second adapters 30B. The retaining member 92c is disposed in the opening 43a and contacts the second body portion 43 of the pedal body 20 to retain the first pad part 92 to the second body portion 43.

In the illustrated embodiment, as seen in FIGS. 20 to 25, the spike pins 17 include a plurality of first spike pins 17A and a plurality of second spike pins 17B. The first spike pins 17A are double-sided spike pins that project from both sides of the pedal body 20. The second spike pins 17B are single-sided spike pins that project from only one side of the pedal body 20. The first spike pins 17A and the second spike pins 17B are selectively attached to the pedal body 20 via the third holes 58. While FIGS. 20 and 21 only show the first spike pins 17A, the first spike pins 17A and the second spike pins 17B can be used together if needed and/or desired. However, typically, only the first spike pins 17A or only the second spike pins 17B are used with the pedal 12A.

Preferably, each of the spike pins 17 includes a projection portion 90 and an attachment portion 92. More preferably, in the case of the first spike pins 17A, each of the spike pins 17A includes a first projection portion 90a, a second projection portion 90b and the attachment portion 92. On the other hand, in the case of the second spike pins 17B, each of the second spike pins 17B includes a first projection portion 90a and the attachment portion 92. Thus, the second spike pins 17B do not have a second projection portion 90b.

The attachment portion 92 has a first axial end portion 92a and a second axial end portion 92b opposite to the first axial end portion 92a. The first projection portion 90a is coupled to the first axial end portion 92a of the attachment portion 92. The second projection portion 90b is coupled to the second axial end portion 92b of the attachment portion 92. In the case of the first spike pins 17A, the first axial end portion 92a and the second axial end portion 92b are nuts that are threaded to the projection portion 90. Also, in the case of the first spike pins 17A, the attachment portion 92 includes a spacing member 92c (e.g., a sleeve) that is disposed over a center section of the projection portion 90. In the case of the second spike pins 17B, the first axial end portion 92a is a nut that is threaded to the projection portion 90, while the second axial end portion 92b is a head portion that is integrally formed with the projection portion 90.

The first spike pins 17A and the second spike pins 17B are attached to the pedal body 20 via the third holes 58. More specifically, each of the third holes 58 includes a first hole section 58a, a second hole section 58b and a third hole section 58c. The first hole section 58a is configured to receive the first axial end portion 92a (e.g., a nut) in a state where the spike pin 17 is disposed in one of the third holes 58. The third hole section 58a is configured to receive the second axial end portion 92b (e.g., a nut) in a state where the spike pin 17 is disposed in one of the third holes 58. In the case of the first spike pins 17A, the third hole section 58a also receives the spacing member 92c (e.g., a sleeve).

The first hole section 58a has a hexagonal transverse cross section that is configured to engage the first axial end portion 92a (e.g., a nut) so that the first axial end portion 92a does not rotate in the third hole 58 in a state where the spike pin 17 is disposed in the first hole section 58a of one of the third holes 58 . . . . On the other hand, the third hole section 58a has a cylindrical transverse cross section that is configured to permit rotation of the second axial end portion 92b (e.g., a nut) in a state where the spike pin 17 is disposed in the third hole section 58a of one of the third holes 58. The second hole section 58b has a smaller cross sectional width than the first hole section 58a and the third hole section 58c. Thus, a first abutment surface is formed between the first hole section 58a and the second hole section 58b. In this way, inward axial movement of the first axial end portion 92a (e.g., a nut) within the first hole section 58a is limited by the first abutment surface. Also, a second abutment surface is formed between the second hole section 58b and the third hole section 58c. In this way, inward axial movement of the second axial end portion 92c (e.g., a nut) within the third hole section 58c is limited by the second abutment surface. The In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the pedal assembly. Accordingly, these directional terms, as utilized to describe the pedal assembly, should be interpreted relative to a human-powered vehicle (e.g., bicycle) in an upright riding position on a horizontal surface and that is equipped with the pedal assembly. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of". For instance, the phrase "at least one of A and B" encompasses (1) A alone, (2), B alone, and (3) both A and B. The phrase "at least one of A, B, and C" encompasses (1) A alone, (2), B alone, (3)

C alone, (4) both A and B, (5) both B and C, (6) both A and C, and (7) all A, B, and C. In other words, the phrase "at least one of A and B" does not mean "at least one of A and at least one of B" in this disclosure.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pedal assembly for a human powered vehicle, the pedal assembly comprising:
a pedal body including at least one adapter receiving portion configured to receive at least one adapter engaging with at least one fastening member so that a plurality of pedal components different from each other can be mounted to the pedal body through the at least one adapter,
the at least one adapter receiving portion having a non-circular shape corresponding to an external shape of the at least one adapter, and
the at least one adapter receiving portion including a plurality of fastening holes, at least one of the plurality of fastening holes having the non-circular shape at a center of a thickness of the pedal body.

2. The pedal assembly according to claim 1, wherein each of the plurality of fastening holes is configured to receive an adapter of the at least one adapter.

3. The pedal assembly according to claim 1, wherein the at least one adapter includes a plurality of adapters; the at least one adapter receiving portion includes a plurality of adapter receiving portions;
each of the plurality of adapter receiving portions is configured to receive at least one of the plurality of adapters.

4. The pedal assembly according to claim 1, wherein the at least one adapter receiving portion includes a first adapter receiving portion configured to receive at least one first adapter of the at least one adapter and a second adapter receiving portion configured to receive at least one second adapter of the at least one adapter.

5. The pedal assembly according to claim 4, wherein the first adapter receiving portion is configured to receive a pair of the first adapters, and
the second adapter receiving portion is configured to receive a pair of the second adapters.

6. The pedal assembly according to claim 1, wherein the pedal body has a first shoe-disposing surface and a second shoe-disposing surface opposite to the first shoe-disposing surface,
each of the plurality of fastening holes extends completely through the pedal body from the first shoe-disposing surface to the second shoe-disposing surface,
each of the plurality of fastening holes is configured to receive an adapter of the at least one adapter,
each of the at least one adapter has a first shoe-disposing side opening configured to receive a first fastening member of the least one fastening member and a second shoe-disposing side opening configured to receive a second fastening member of the least one fastening member,
the first shoe-disposing side opening is positioned at the first shoe-disposing surface, and
the second shoe-disposing side opening is positioned at the second shoe-disposing surface.

7. The pedal assembly according to claim 6, wherein the at least one adapter receiving portion includes a first adapter receiving portion having a pair of first fastening holes of the plurality of fastening holes and a second adapter receiving portion having a pair of second fastening holes of the plurality of fastening holes.

8. The pedal assembly according to claim 1, wherein the non-circular shape includes one of an oval shape, a D shape, a polygon shape and a quadrant shape.

9. The pedal assembly according to claim 1, further comprising
the at least one adapter non-rotatably coupled to the at least one adapter receiving portion.

10. The pedal assembly according to claim 9, further comprising
the at least one fastening member detachably coupled to the at least one adapter.

11. The pedal assembly according to claim 10, wherein the at least one fastening member includes a plurality of fastening members,
the plurality of fastening members include a first protrusion configured to restrict movement of the at least one adapter in a first direction with respect to the at least one adapter receiving portion and a second protrusion configured to restrict movement of the at least one adapter in a second direction with respect to the at least one adapter receiving portion, and the second direction is different from the first direction.

12. The pedal assembly according to claim 10, wherein the pedal body has a first shoe-disposing surface and a second shoe-disposing surface opposite to the first shoe-disposing surface, the at least one adapter receiving portion includes a first adapter receiving portion having a pair of first fastening holes extending completely through the pedal body from the first shoe-disposing surface to the second shoe-disposing surface, and a second adapter receiving portion having a pair of second fastening holes extending completely through the pedal body from the first shoe-disposing surface to the second shoe-disposing surface, the at least one adapter includes a plurality of adapters, one of the plurality of adapters is disposed in each of the pair of first fastening holes and the pair of second fastening holes, the at least one fastening member includes a plurality of fastening members, and each of the plurality of adapters has a first shoe-disposing side opening configured to receive a first fastening member of the plurality of fastening members and a second shoe-disposing side opening configured to receive a second fastening member of the plurality of fastening members.

13. The pedal assembly according to claim 1, further comprising a pedal axle having a rotational center axis defining an axial direction, wherein, the pedal body includes an inner body portion, an outer body portion, a first body portion extending in the axial direction, a second body portion extending in the axial direction and an intermediate body portion configured to receive the pedal axle and extending in the axial direction, the intermediate body portion is positioned between the outer body portion and the inner body portion and between the first body portion and the second body portion, and the at least one adapter receiving portion is provided to the intermediate body portion.

14. The pedal assembly according to claim 13, wherein each of the plurality of fastening holes extends completely through the pedal body from a first shoe-disposing surface of the pedal body to a second shoe-disposing surface of the pedal body.

15. The pedal assembly according to claim 14, wherein the plurality of fastening holes includes a pair of first fastening holes on a first side of the intermediate body portion.

16. The pedal assembly according to claim 15, wherein the plurality of fastening holes includes a pair of second fastening holes on a second side of the intermediate body portion, and the second side is opposite to the first side.

17. The pedal assembly according to claim 16, wherein the first fastening holes are spaced apart from each other in the axial direction by a first distance, and the second fastening holes are spaced apart from the first fastening holes in a direction perpendicular to the axial direction by a second distance different from the first distance.

18. The pedal assembly according to claim 17, wherein the second distance is smaller than the first distance.

19. The pedal assembly according to claim 17, wherein the second fastening holes are spaced apart from each other in the axial direction by the first distance.

20. The pedal assembly according to claim 10, further comprising the plurality of pedal components configured to be selectively coupled to the at least one adapter receiving portion of the pedal body using the at least one fastening member.

21. The pedal assembly according to claim 20, wherein the plurality of pedal components includes a cleat coupling unit.

22. The pedal assembly according to claim 20, wherein the plurality of pedal components includes a toe-clip.

23. The pedal assembly according to claim 20, wherein the plurality of pedal components includes a friction pad.

24. The pedal assembly according to claim 23, wherein the friction pad includes a first pad part and a second pad part, and the second pad part is a separate piece from the first pad part.

25. The pedal assembly according to claim 20, wherein the plurality of pedal components includes at least pair of a cleat coupling unit, a toe-clip and a friction pad.

26. A pedal assembly for a human powered vehicle, the pedal assembly comprising:

a pedal body including a plurality of fastening holes; and a plurality of adapters, the plurality of adapters being disposed inside the plurality of fastening holes so that at least one pedal component can be mounted to the pedal body through the plurality of adapters, at least one of the plurality of fastening holes having a non-circular shape at a center of a thickness of the pedal body, and the at least one adapter being non-rotatably coupled to the at least one adapter receiving portion.

27. A pedal assembly for a human powered vehicle, the pedal assembly comprising:

a pedal body including at least one adapter receiving portion;

at least one adapter; and at least one fastening member, the at least one fastening member being detachably coupled to the at least one adapter, the at least one adapter receiving portion configured to receive at least one adapter such that a plurality of pedal components different from each other can be mounted to the pedal body through the at least one adapter, and the at least one adapter receiving portion having a non-circular shape corresponding to an external shape of the at least one adapter, the at least one adapter receiving portion including a plurality of fastening holes, at least one of the plurality of fastening holes having the non-circular shape at a center of a thickness of the pedal body, and the at least one adapter being non-rotatably coupled to the at least one adapter receiving portion.

28. The pedal assembly according to claim 27, wherein the at least one adapter receiving portion includes a hole extending completely through the pedal body.

* * * * *